(12) United States Patent
Shahidzadeh et al.

(10) Patent No.: US 11,133,929 B1
(45) Date of Patent: *Sep. 28, 2021

(54) SYSTEM AND METHOD OF BIOBEHAVIORAL DERIVED CREDENTIALS IDENTIFICATION

(71) Applicant: Acceptto Corporation, Portland, OR (US)

(72) Inventors: Nahal Shahidzadeh, Portland, OR (US); Shahrokh Shahidzadeh, Portland, OR (US); Haitham Akkary, Portland, OR (US); Frank Stefan Ulbrich, Karlsruhe (DE); Mani Malekmohammadi, North Vancouver (CA)

(73) Assignee: Acceptto Corporation, Portland, OR (US)

( * ) Notice: Subject to any disclaimer, the term of this patent is extended or adjusted under 35 U.S.C. 154(b) by 383 days.

This patent is subject to a terminal disclaimer.

(21) Appl. No.: 16/249,772

(22) Filed: Jan. 16, 2019

Related U.S. Application Data

(60) Provisional application No. 62/618,066, filed on Jan. 16, 2018.

(51) Int. Cl.
| | |
|---|---|
| *H04L 29/06* | (2006.01) |
| *H04L 9/08* | (2006.01) |
| *G06F 21/45* | (2013.01) |
| *G06F 21/32* | (2013.01) |
| *G06F 21/35* | (2013.01) |

(52) U.S. Cl.
CPC ............ *H04L 9/0866* (2013.01); *G06F 21/32* (2013.01); *G06F 21/35* (2013.01); *G06F 21/45* (2013.01); *H04L 9/0891* (2013.01); *H04L 9/0897* (2013.01)

(58) Field of Classification Search
CPC ... H04L 9/0866; H04L 9/0891; H04L 9/0897; G06F 21/32; G06F 21/35; G06F 21/45
USPC .............................................................. 726/6
See application file for complete search history.

(56) References Cited

U.S. PATENT DOCUMENTS

| | | |
|---|---|---|
| 5,903,882 A | 5/1999 | Ay |
| 6,636,721 B2 | 10/2003 | Threadgill |
| 6,850,497 B1 | 2/2005 | Sigler |
| 7,243,369 B2 | 7/2007 | Bhat |
| 7,395,435 B2 | 7/2008 | Benhammou |
| 7,519,826 B2 | 4/2009 | Carley |
| 7,584,152 B2 | 9/2009 | Gupta |
| 7,721,322 B2 | 5/2010 | Sastry |
| 7,962,419 B2 | 6/2011 | Gupta |
| 7,971,062 B1 | 6/2011 | Hughes et al. |
| 8,127,142 B2 | 2/2012 | Cuppett |
| 8,127,982 B1 | 3/2012 | Casey |

(Continued)

OTHER PUBLICATIONS

Khanna, Tarun, "Contextual Intelligence", Harvard Business Review, Sep. 2014.

*Primary Examiner* — Malcolm Cribbs
(74) *Attorney, Agent, or Firm* — Roark IP

(57) ABSTRACT

A system and method for biobehavorial identification may include a user device, a secure system/client device, and a server. The elements of the system work together to monitor the biologic features (e.g., fingerprints, pupils, or the like) and behavior (e.g., wake time, exercise time, location) to verify the authenticity of a user requesting access to a database and/or secure facility.

23 Claims, 11 Drawing Sheets

(56) References Cited

U.S. PATENT DOCUMENTS

| | | |
|---|---|---|
| 8,205,249 B2 | 6/2012 | Meister et al. |
| 8,261,089 B2 | 9/2012 | Cobos et al. |
| 8,346,924 B1 | 1/2013 | Bucher et al. |
| 8,423,476 B2 | 4/2013 | Bishop |
| 8,457,781 B2 | 6/2013 | Bailey |
| 8,510,797 B2 * | 8/2013 | Kasturi ............... G06F 21/32 726/2 |
| 8,510,811 B2 | 8/2013 | Kuang et al. |
| 8,516,542 B2 | 8/2013 | Lerner |
| 8,572,714 B2 | 10/2013 | Radhakrishnan |
| 8,612,357 B2 | 12/2013 | Phillips |
| 8,615,562 B1 | 12/2013 | Huang |
| 8,661,254 B1 * | 2/2014 | Sama ............... H04L 63/0838 713/168 |
| 8,756,661 B2 | 6/2014 | Berg |
| 8,776,204 B2 | 7/2014 | Faynberg et al. |
| 8,831,677 B2 | 9/2014 | Villa-Real |
| 8,869,241 B2 * | 10/2014 | Davis ............... G06F 21/316 726/3 |
| 8,904,494 B2 | 12/2014 | Kindler |
| 9,374,369 B2 | 6/2016 | Mahaffey |
| 9,391,779 B2 * | 7/2016 | Bair ............... H04L 9/3231 |
| 9,419,951 B1 | 8/2016 | Felsher |
| 9,510,320 B2 | 11/2016 | Reed |
| 9,613,257 B2 | 4/2017 | Phillips |
| 2003/0061111 A1 | 3/2003 | Dutta |
| 2003/0115142 A1 | 6/2003 | Brickell et al. |
| 2004/0155101 A1 | 8/2004 | Royer |
| 2005/0060584 A1 | 3/2005 | Ginter |
| 2005/0102530 A1 | 5/2005 | Burrows |
| 2006/0167762 A1 | 7/2006 | Hahn-Carlson |
| 2007/0011066 A1 | 1/2007 | Steeves |
| 2007/0033136 A1 | 2/2007 | Hu |
| 2007/0156611 A1 | 7/2007 | Gupta |
| 2007/0262136 A1 | 11/2007 | Ou |
| 2008/0101283 A1 | 5/2008 | Calhoun |
| 2008/0141333 A1 | 6/2008 | Chen |
| 2008/0307487 A1 | 12/2008 | Choyi |
| 2009/0132808 A1 | 5/2009 | Baentsch et al. |
| 2009/0259838 A1 | 10/2009 | Lin |
| 2009/0307135 A1 | 12/2009 | Gupta |
| 2010/0228996 A1 | 9/2010 | Ginter et al. |
| 2011/0035594 A1 | 2/2011 | Fox |
| 2011/0035788 A1 | 2/2011 | White et al. |
| 2011/0086612 A1 | 4/2011 | Montz et al. |
| 2011/0093927 A1 | 4/2011 | Leppanen |
| 2011/0173017 A1 | 7/2011 | Salonen |
| 2011/0173448 A1 | 7/2011 | Baentsch et al. |
| 2011/0204142 A1 | 8/2011 | Rao |
| 2011/0209200 A2 | 8/2011 | White |
| 2011/0288996 A1 | 11/2011 | Kreutz et al. |
| 2011/0296513 A1 | 12/2011 | Kasad |
| 2011/0307949 A1 | 12/2011 | Ronda et al. |
| 2012/0069131 A1 | 3/2012 | Abelow |
| 2012/0117157 A1 | 5/2012 | Ristock |
| 2012/0117609 A1 | 5/2012 | Dalzell |
| 2012/0192260 A1 | 7/2012 | Kontsevich |
| 2012/0239942 A1 | 9/2012 | Yan |
| 2012/0330788 A1 | 12/2012 | Hanson et al. |
| 2013/0007849 A1 | 1/2013 | Coulter |
| 2013/0047202 A1 | 2/2013 | Radhakrishnan |
| 2013/0047213 A1 | 2/2013 | Radhakrishnan et al. |
| 2013/0111549 A1 | 5/2013 | Sowatskey |
| 2013/0185205 A1 | 7/2013 | Boss et al. |
| 2013/0205133 A1 | 8/2013 | Hess |
| 2013/0298242 A1 | 11/2013 | Kumar et al. |
| 2013/0305322 A1 | 11/2013 | Raleigh |
| 2014/0040975 A1 | 2/2014 | Raleigh |
| 2014/0189808 A1 | 7/2014 | Gupta |
| 2014/0189809 A1 | 7/2014 | Koved et al. |
| 2014/0189840 A1 | 7/2014 | Metke et al. |
| 2014/0247155 A1 * | 9/2014 | Proud ............... A61B 5/1118 340/870.16 |
| 2014/0304795 A1 | 10/2014 | Bruno et al. |
| 2015/0058931 A1 * | 2/2015 | Miu ............... G06Q 20/4016 726/3 |
| 2016/0055690 A1 * | 2/2016 | Raina ............... G07C 9/28 340/5.61 |
| 2016/0189150 A1 * | 6/2016 | Ahuja ............... G06Q 20/4016 705/44 |
| 2017/0357917 A1 * | 12/2017 | Holmes ............... H04L 9/3231 |

* cited by examiner

SYSTEM AND METHOD OF BIOBEHAVIORAL DERIVED CREDENTIALS IDENTIFICATION

PRIORITY

This application claims priority to U.S. Provisional Patent Application Ser. No. 62/618,066 with a filing date of Jan. 16, 2018; which is hereby incorporated herein in its entirety.

TECHNICAL FIELD

The subject matter disclosed herein generally relates to biologically and behaviorally derived credentials to provide identification for use in access management to a secure facility, secure system and other secure services and associated transactions.

BACKGROUND

Digital transactions including but not limited to financial transactions, data access, data transmission, application usage, and various physical access management and variety of other types may stem not from a party authorized to enter in to the transaction but by parties that are either unauthorized to enter into the transaction or bad actors who have acquired the means to enter in to the transaction illegally. For instance, a stolen credit card number or bank account access may be utilized to make fraudulent purchases. A stolen or compromised password may be utilized to improperly access information. A stolen badge, personal identity verification (PIV) or common access card may be utilized to improperly access a secured facility and systems within.

SUMMARY

Aspects of the disclosure include a system comprising: a first mobile device having a first network interface configured to be communicatively coupled to a network utilizing a secure communication protocol and at least one first hardware processor of a plurality of hardware processors coupled to a first memory and configured to: receive a first security code key and embed the first security code key in the first memory; monitor behavior of the user of the first mobile device and compare the behavior against an identity confidence threshold and generate a second security code key based meeting the identity confidence threshold; a second mobile device having a second network interface configured to be communicatively coupled to the network utilizing the secure communication protocol and at least one second hardware processor of a plurality of hardware processors coupled to a second memory and configured to: receive a third security code key based on the first security code key and second security code key being valid and meeting a threshold and the authentication of the user of interest identity.

Further aspects of the disclosure include a method of securely allowing access to a restricted facility comprising: receiving a first security code key at a first mobile device having a first network interface configured to be communicatively coupled to a network utilizing a secure communication protocol and at least one first hardware processor of a plurality of hardware processors coupled to a first memory; embedding the first security code key in the first memory; monitoring behavior of the user of the first mobile device and comparing the behavior against an identity confidence threshold; generating a second security code key based upon meeting the identity confidence threshold; receiving a third security code key based on the first security code key and second security code key being valid at a second mobile device having a second network interface configured to be communicatively coupled to the network utilizing the secure communication protocol and at least one second hardware processor of a plurality of hardware processors coupled to a second memory.

Further aspects of the disclosure include a method of securely allowing access to a restricted facility comprising: receiving a first security code key at a first mobile device having a first network interface configured to be communicatively coupled to a network utilizing a secure communication protocol and at least one first hardware processor of a plurality of hardware processors coupled to a first memory; embedding the first security code key in the first memory; monitoring behavior of the user of the first mobile device and comparing the behavior against an identity confidence threshold; generating a second security code key based upon meeting the identity confidence threshold; receiving a third security code key based on the first security code key, second security code key, and a plurality of other protocols being valid at a second mobile device having a second network interface configured to be communicatively coupled to the network utilizing the secure communication protocol and at least one second hardware processor of a plurality of hardware processors coupled to a second memory.

BRIEF DESCRIPTION OF THE DRAWINGS

Some of the embodiments are illustrated herein by way of example and with no limitations in the figures of the accompanying drawings.

FIG. 9B, in particular, illustrates a case where a phone and smart watch are not permitted inside a secure facility.

DETAILED DESCRIPTION

Figure 1:
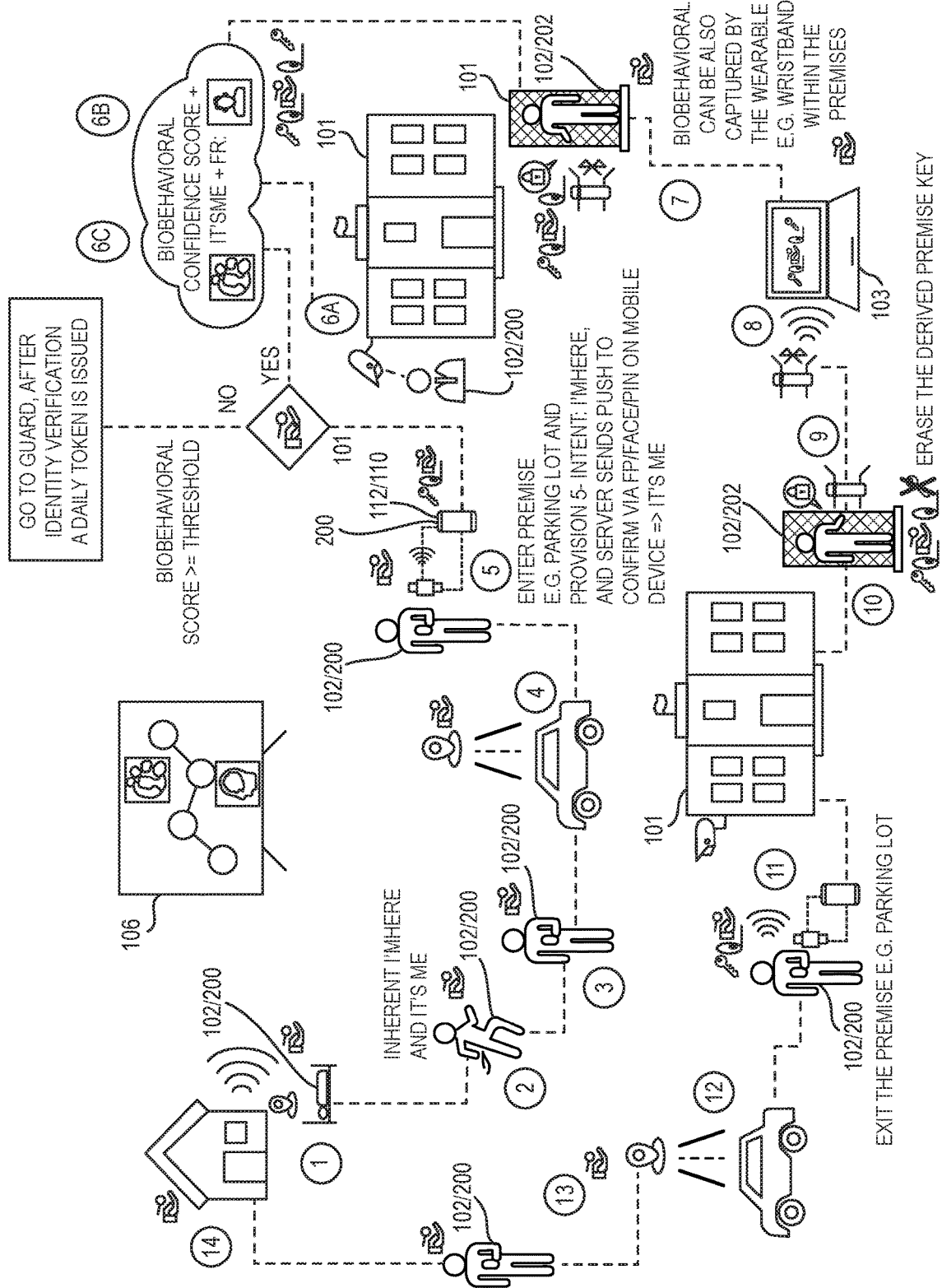
FIG. 1 illustrates a schematic view of a biobehavioral derived credential generation identification and use system and method ("biobehavioral system and method") 100.

Binary authentication using user identification (ID) plus a password and some method of two factor or even many factor authentication using binary solutions such as discrete tokens, smart cards for access to highly secured facilities and networks is not sufficient as these methods can be easily compromised or cloned and used by unauthorized threat actors. Many drivers reduce the effectiveness of such binary authentications including advancements of computing technologies (e.g., computer processing units (CPU) and graphics processing units (GPU)). These improvements in technology enable ever increasing techniques, including but not limited to the brute forcing of passwords, credential stuffing, the surge of data breaches and resulting mass account takeovers, and most importunately the lack of visibility of abuse of credentials, or the lack of ability for a real-time verification of the authenticity of users and their associated credentials. In addition, the missing real-time audit and verification of compliance using right set of analytics makes reliance on passwords and binary time based one time password (TOTP) based tokens a losing battle. This combined with ever decreasing cost of cloning hardware tokens such as, but not limited to, personal identification verification (PIV) or common access cards (CAC) and the fact that even if not cloned a simple loaning and temporary possession of such binary second factor authentication systems can result in a system compromise.

The problem is even more complex in that in addition to compromised passwords and legacy binary tokens, the burden of identity proofing for the user owning the access credential remains unsolved. In that context a method is needed to prove continuously that the owners of the assets such as password and tokens are indeed the rightful owners versus threat actors who via a takeover possess the critical assets is unsolved. Note that even biometric verification is insufficient given biometric proofing such as fingerprints, irises, facial profiles, voice recognition and the like are also all breachable given the techniques and availability of biometric data through social media channels and existing rich set of data pools that allows lifting or synthesizing such biometric identifiers. Examples of this type of available personal data may include a high resolution caption of your hands when you waved or thumbs up at last picture snapped, your smiling face from a tagged posted picture, or your voice on a posted video or banks of stored user voice at your local or offshore call service centers who now use voice recognition as the biometric identity proofing, all can be lifted and misused to impersonate a user. In some cases, even the rightful owners may become the compromised agents and forced to act as a threat actor (e.g., a compromised user who is under duress is forced to perform an unauthorized access).

The negative impact of a breach, both the physical or logical access to privileged assets such as a secured locations or privileged applications and data in a computer system can result in a significant loss and unrecoverable damage. To eliminate such vulnerability novel protection techniques and systems are needed that mitigates current shortcomings.

FIG. 1 illustrates a flow of an event using an end-to-end ("End2End") Biobehavioral™ derived credential generation and use system and method 100. A "biobehavioral" derived credential is one that is drawn from a combination of human biological features and behavioral activities. In FIGS. 1-10D, a method and system 100 is disclosed for using biometric and behavioral based information to provide proof of identity and a dynamic way of calculating a derived key. The derived key is an advanced dynamic time based derived key used at the time of access to a secure facility 101 of an enterprise such as a government agency, pharmaceutical company, health provider company, a financial institution, school and the like. The derived key may also be used to control access to a secure system (or client device) 103 associated with these enterprises to unlock logical assets such as computer access or any remote access to a workspace and privileged applications including financial transactions, data sharing or transfer using either a network 108 (e.g., the Internet) or an intranet. In certain embodiments, users 102 of the biobehavorial derived credential may be employees of an enterprise. Alternatively, the term "user" 102 as used herein may be nonhuman such as a machine (e.g., robot or trained organic being trained to do a task). The user 102 may have privileged secure access to highly sensitive assets or data associated with these enterprises. In such instances, the users 102 are pre-authorized and trusted with certain access permissions based on roles and rules of such an enterprise. The biobehavorial system and method 100 disclosed herein helps tracking of users 102 outside and inside a secure facility 101 for not only authentication but also continuous post authorization monitoring to make sure that the roles and tasks performed both in physical and logical space (i.e., cyber space) are permitted, normal and within the scope of the responsibility of the authorized user 102. The post authorization will be continuous both in physical and cyber space where machine learning algorithms may detect, recognize, infer, predict and core every move of the user 102 and hence are ability to identify anomalies. In one example, access may be provided to data centers and roles and tasks of a technician who is supposed to change a drive in a server versus a user 102 who accesses classified and privileged information. In another example, access may be denied to others who perform a financial transaction that may be deemed abnormal. In another example, access may be denied as well to a person behaving abnormally at an airport, hospital room, train station, school or other locations.

A biobehavioral derived credential is the means of establishing a graphical representation of a user 102 or a system behavior and establishing a history and norm which can later be used to infer, predict and score whether the user 102 and/or system activity is normal or not. The novel method of recognizing and scoring specific nodes of the state graph of user 102 leveraging and classifying certain events as significant events using artificial intelligence and machine learning of system 100 enables the system to constantly enriching its prediction model near perfection. In case of a user 102, the habits and actions throughout the daily activities and scoring the confidence on the user 102 normality against learned and recorded behavior and habits up to the time of entry to the secure facility 101 and/or access to a secure system (or client device) 103. The biobehavioral credential and score collected from a user device 200 (as described in detail in connection with FIGS. 2 and 3) is then transferred to an auxiliary user device 202 (e.g., a wristband) when entering the secure facility 101 or accessing the secure system (or client device) 103. The auxiliary user device 202 will have a provisioned unique and immutable credential. Such an immutable credential can be provisioned by the enterprise and/or supporting agencies which operate and are responsible for safety of the secure facility 101 and/or secure system/client device 103. The immutable credential can be stored as a cryptographic secure key inside a secured storage of the auxiliary user device 202 such as a trusted platform module (TPM) or within a trusted execution environment (TEE) or trusted secure element/enclave of device 202. The immutable credential can also be used as means of secure pairing of device 200, the auxiliary device 202 and/or secure system/client device 103 and hence secure transfer of biobehavior derived score of user 102 at the time of pairing and transfer. The user device 200, auxiliary user device 202 and secure system/client device 103 will have a symbiotic relationship with the passing of user 102 behavior back and forth between the three different devices. The combination of the secure immutable credential and the biobehavorial derived score of user 102 results in a unique temporal key and is only issued if user 102 is in possession of both devices 200 and 202, user biobehavioral derived score using the contextual factors of their behavior and habits matches the user 102 graph and the learned behavior of the user 102. At the point of entry to secure facility 101 other methods of authenticating a user 102 by a secure facility 101 may also be used to ensure proper identification. These other methods may include authentication system(s) such as biometric identification of user 102 by using a vision system (as shown in FIG. 1) or an out of band authentication system may be used for verification. Both of these methods may be used to assist in generating the biobehavioral derived credential to transform a first security code key (i.e., a blue key) plus the second security code key (i.e., a green key) to a create a third security code key which is the biobehavioral derived credential (i.e., gold key). The biobehavorial system and method 100 may be temporal in nature allowing the user 102 access to all or parts of a secure facility 101 or a secure system 103 for a predetermined time period such as minutes, a day, or longer.

In some embodiments user device 200 will not be allowed to enter the facility 101 and hence the auxiliary device 202 may only be allowed. In some cases the auxiliary device 202 may be used to continue collecting user 102 biobehavioral data and scoring within the premises of the secure facility 101 and maintaining the validity of the green key (or second key) by ensuring the biobehavioral threshold meets the minimum requirement to maintain the validity of the gold key (i.e., biobehavioral derived credential or third key) for the current access.

Figure 2:
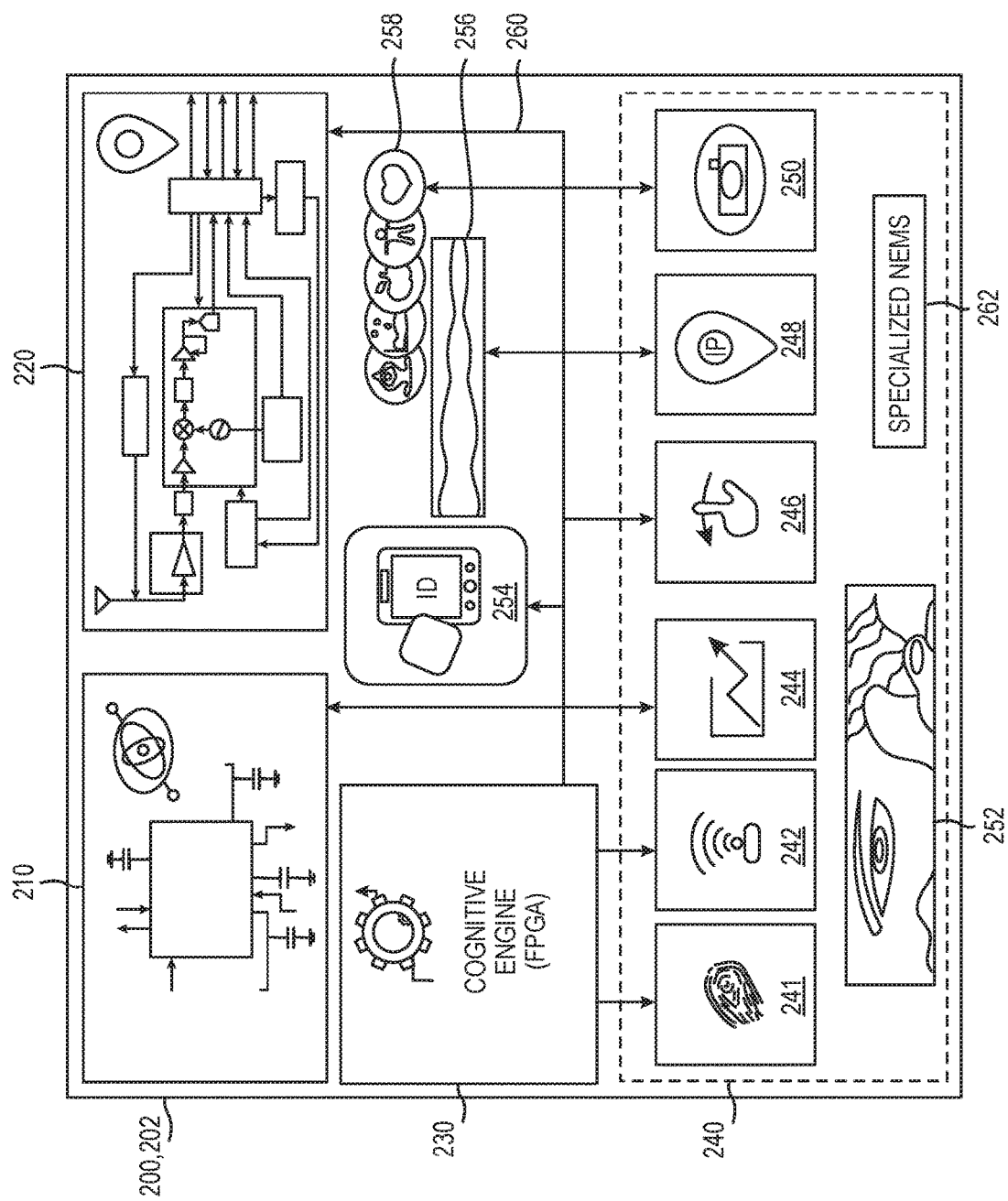
FIG. 2 illustrates a graphical view of the components of a user device 200, auxiliary user device 202, and secure system/client device 103 which can track the behavior and habits of a user 102.
Figure 3:
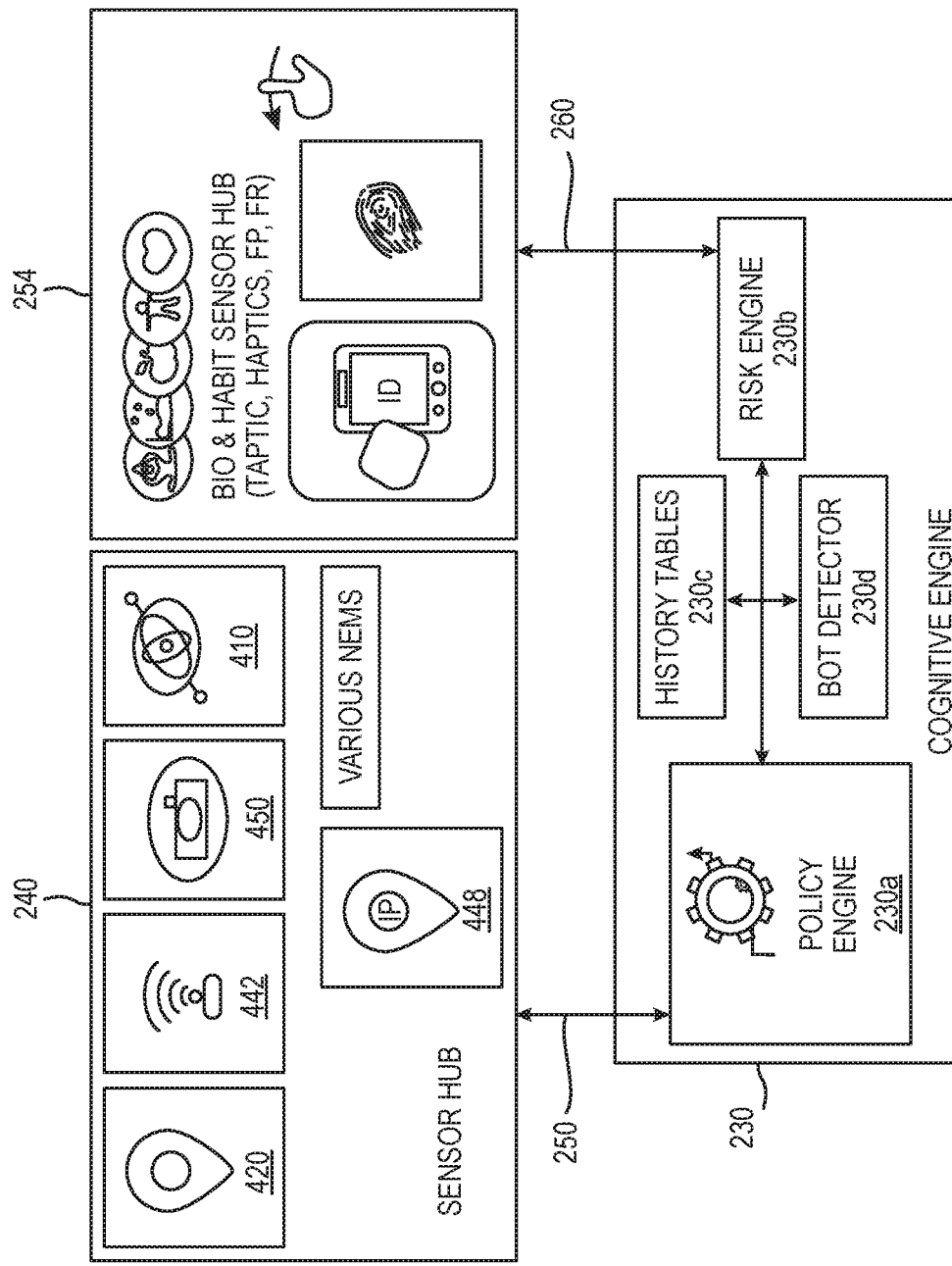
FIG. 3 illustrates a graphical view of more details of a cognitive engine 230 and sensor hub 240 that are part of the user device 200, auxiliary user device 202 and/or secure server/client device 103.

FIGS. 2 and 3 illustrate an example of a user device (or first device) 200 and/or auxiliary (or second or derived) device 202 that may be used with the biobehavioral system and method 100 and the user 102 in more detail. The secure system or client device 103 may also include the hardware and software disclosed in FIGS. 2 and 3. The user device 200, auxiliary user device 202 and secure system/client device 103 can each separately have all or some predetermined subset of components and functionalities as described below. Devices 200, 202 and 103 may be wireless devices with integrated compute capabilities, sensors and at least one field programmable gate array (FPGA) that is programmed with customized biobehavioral compute technology and customized nano-electromechanical systems (NEMS). The devices 200, 202 and 103 may be a laptop computer, cellphone, smartphone (e.g., Apple® iPhone®), a wireless user digital assistant, wireless tablet (e.g., Apple® iPad®), wireless watch (e.g., smart watch and/or sports watch), wearable device (e.g., smart glasses), video game devices, wireless electronic patch, wireless device embedded under the skin, a wearable device mounted on a wristband, a wireless device on the user's clothing, and any other device capable of wireless communications with a network 108. Either of the devices 200 and 202 alternatively could be a virtual digital tattoo with some radio frequency (RF) capability or alternatively can be a virtual quick response (QR) code that is generated for user 102 at the time of entry and is associated with a moving user 102 and is continually refreshed to allow for tracking the movement of the user 102 tracked, detected and recognized using an ambient intelligence vision system. The virtual QR code changes as the user 102 would travel through a secure facility 101. Devices 200 and 202 could be associated with the user 102 and include descriptive physical features, clothing and/or the time of arrival at the secure facility 101. The devices 200 and 202 may also be off the shelf wristbands with specialized applications and algorithms designed and downloaded onto the devices 200 and/or 202. The devices 200 and 202 may additionally or alternatively be an electronic device which is not conventionally mobile, such as a desktop computer and the like.

As shown in FIG. 2, the devices 200, 202 and 103 may include the transceiver equipment of a modern smartphone such as a gyroscope 210 and a global positioning satellite (GPS) 220. The devices 200, 202 and 103 could also have a cognitive engine 230. Cognitive engine 230 may be a FPGA connected to a biometric, habit sensor and application hub 240. The cognitive engine 230 may include a series of specialized nano-electromechanical systems (NEMS) 262. The FPGA of the cognitive engine 230 may be programmed with customized biobehavioral compute technology. In an alternative embodiment, instead of an FPGA the functions of the cognitive engine 230 may be implemented other integrated hardware such as specialized ASICs, in software. In an alternative embodiment, instead of an FPGA the functions of the cognitive engine 230 may be implemented in software.

As shown in FIG. 2, sensor hub 240 is capable of receiving and analyzing inputs from a plurality of sensors and applications. The sensor hub 240 may include taptics, haptics, finger prints, location coordinates and elevation, user 102 habits and facial, voice and ambient noise, magnetic signature, light, air distinct characteristics like humidity, carbon monoxide, and as such, or all other recognition sensing capabilities. The sensors in the hub 240 may also include customized NEMS. The sensors may be discrete or integrated into the sensor hub 240. The information from the hub 240 is collected and analyzed in cognitive engine 230 to provide a risk score in evaluating the level of verification of the user 102 of the devices 200, 202 and 103 and whether he or she (or machine entity) is the correct authorizing entity. The sensor hub 240 may include a finger print input sensor 241 for a biometric input. The hub 240 may include a wireless detection sensor 242 that may be used to analyze a variety of wireless communication parameters such as a Service Set Identifier (SSID) and their associated attributes such signal strength and proximity to in use WLAN, LAN or WIFI access points.

Reference item 244 indicates an analytical engine which is configured to receive input from the other sensors in the sensor hub 240 to monitor the user's spatiotemporal and behavior patterns and habits to determine if the user 102 of either of the devices 200 or 202 is the correct entity. For example, habits might include environmental and/or behavioral patterns of the user 102 of the devices 200, 202 and 103 such as the time the user 102 wakes up, arrives at the gym, ambient identifiers of various forms, and/or arrives at the secure facility 101 and the like. Sensor 246 is used to measure gestures regarding how the user 102 handles the devices 200, 202 and 103. For example, these gestures might include how the user 102 swipes the screen of the devices 200, 202 and 103 with their finger including pressure, direction, right handed vs. left handed, and the like. In addition, sensor 246 may measure the electromagnetic signature of the operating environment of the devices 200, 202 and 103 to determine if it fits a profile for the user 102. For example, the subscriber identification module (SIM) card and mobile identification of the devices 200, 202 and 103 combined with the background electromagnetic factors may all be used in a verification process that the user 102 of the devices 200, 202 and 103 is the correct entity. Reference item 248 measures an IP address being used by the devices 200, 202 and 103 and may use a look up feature to verify the devices 200, 202 and 103 are in a region typically occupied by the user 102. Camera 250 may be used for facial recognition of the user 102 and other biometric inputs such as a tattoo or the like. In addition, the camera 250 may be used to capture a background of the user 102 of the devices 200, 202 and 103 to determine if it is an environment in which the user 102 oftentimes is found (e.g., a picture hanging behind the user 102 of the devices 200, 202 and 103 may conform to a user 102 profile). Iris scanner 252 may be used to confirm through an eye scan the identity of the device operator. Reference item 254 indicates the devices 200, 202 and 103 "unique identifications" which may be tied to a SIM card number and all associated unique signatures, an International Mobile Equipment Identification (IMEI) number or an Apple® identification, a telecommunications carrier (e.g., AT&T®, Verizon®), battery serial number or the like. Ambient noise sensor 256 measures the noise levels surrounding the devices 200, 202 and 103 including noises from nature and manmade noises (including communication equipment produced radio frequency noise). Ambient sensor 256 may also be able to measure a speaking voice to create a voiceprint to be able to verify that the user 102 is authentic. Reference item 258 is an application that measures the "wellness" of the user 102 of the devices 200, 202 and 103 including heart rate, sleep habits, exercise frequency, and the like to gather information on the devices 200, 202 and 103 and the user's lifestyle to contribute to verification decisions. Bus 260 couples the sensors and applications of the hub 240 to the cognitive engine 230.

FIG. 3 shows a more detailed view of the cognitive engine 230 and sensor hub 240. The cognitive engine 230 includes a policy engine 230a, a risk engine 230b, history tables 230c, and bot detector 230d. The policy engine 230a sets the factors in evaluating the risk when receiving input from the sensors and applications on the sensor hub 240. The risk engine 230b calculates the information received from the sensor hub 240 and makes a determination regarding a risk score in regard to the current user 102 of the devices 200, 202 and/or 103. The history tables 230c record the user's habits of the devices 200 202, and/or 103. The bot detector 230d determines whether a computer program is attempting to trick the mobile devices 200, 202 and/or 103 into thinking it is a legitimate user 102 by simulating the device owner activities and is attempting to conduct a verification without the actual owner. In one implementation, the bot detector 230d monitors which applications typically operate on the devices 200, 202 and 103 and if it discovers a new application residing and running beyond the routine, it raises a risk level warning that something unusual is happening with the devices 200, 202 and 103. Overall, the cognitive engine 230 assists in determination of the type of authentication required based on risk score.

Figure 4:
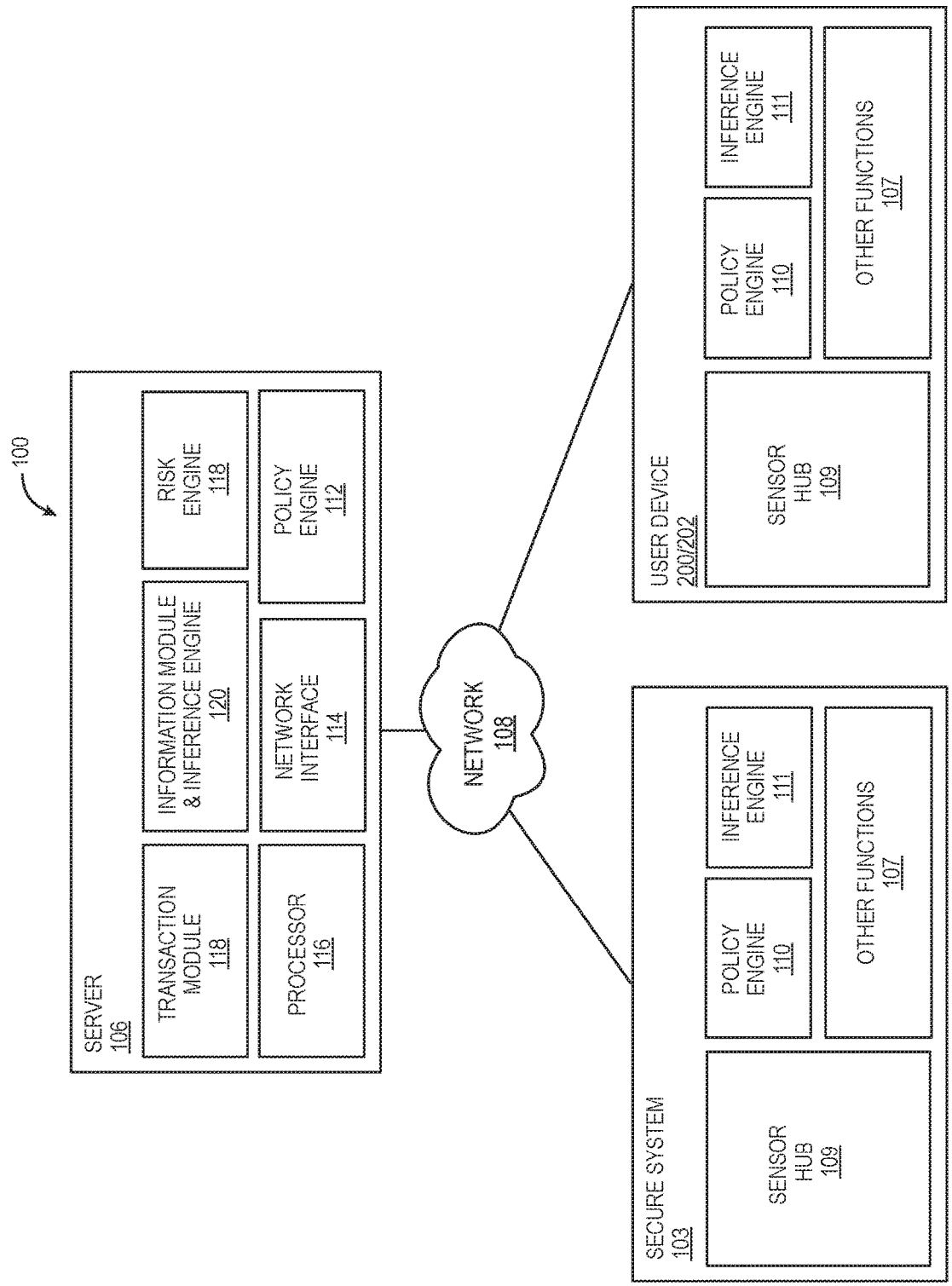
FIG. 4 illustrates a graphical simplified view of system 100 including a server 106, a user device 200, and a secure system/client device 103.

FIG. 4 is a diagram of system 100 showing fewer elements than an overall system diagram shown in FIG. 1. As discussed above, system 100 includes a user device 200, a secure system/client device 103, and a server 106, in an exemplary embodiment. The user device 200, secure system/client device 103, and server 106 are communicatively coupleable with respect to one another via a network 108 so that the server can monitor these devices 200 to gather behavioral and/or biometric data of a user 102 to determine whether they should be allowed access to a secure facility 101 and/or secure system/client device 103. The network 108 may be the Internet or any other suitable public or private data network. The network 108 may include or be accessed by WiFi, Bluetooth, radio-frequency identification (RFD), near field communications (NFC), and so forth. The system 100 may provide customer and transaction authentication based, at least in part, on biobehavioral verification, as disclosed above.

As shown in FIG. 4, the user device 200 may be a particular, designated electronic, computational, and/or communication device associated with a user 102 who will be seeking access to a secure facility 101, secure system/client device 103 or the like. The user device 200 and/or secure system/client device 103 may be registered to a particular user 102. For instance, a smartphone may be designated as the device 200 of a user 102. Alternatively, the device 200 may incorporate or function on multiple electronic devices or may be any of a variety of electronic devices 200 a user 102 happens to be using at the time such as a fitness device or other devices or functions 107. Sensor hub 109 allows a variety of environmental/contextual information to be monitored. Inference engine 111 may be used in verifying the identity of the user 102.

The secure system/client device 103 may be another device upon which the user 102 is operating. The secure system/client device 103 may be any suitable electronic, computational, and/or communication device for conducting such a transaction, such as mobile devices as disclosed herein, desktop computer, cash registers, kiosks, order terminals, electronic locks, automobile locks, or any location or device on which a user 102 may seek to access to a secure system/client device 103, an electronic location, a secure facility 101, user information, or other location or item having restricted access. As such, while such a secure system/client device 103 may have a user input device, such as a keyboard or keypad, the user input terminal would not necessarily have the capacity to display messages to a user 102 attempting to enter into the transaction.

The server 106 may be operated by or for the benefit of an enterprise which may be any party that may offer a service or control access to a secure facility 101, secure system/client device 103 or something for which attempts to engage by a user 102 may need to be authorized or authenticated by an authorizing party. (An exemplary operator of the server may be Acceptto™ Corporation through its eGuardian™ service).

The server 106 may, in various examples, be a Machine to Machine Digital Key Authentication (M2M-DKA) server and may utilize a secure communication protocol over the network 108. The server 106, and the biobahavioral system and method 100 generally, may provide an integrated per-user contextual pattern detection for a secure facility 101 operator or any relying party and the customers enabling transparency and detection of attacks and leakage of secure information.

In the illustrated example shown in FIG. 4, the user device 200, secure system/client device 103 and the server 106 incorporate a user policy engine 110 and a relying party policy engine 112. The policy engines 110, 112 may establish policy orchestration for the biobehavioral system and method 100 generally. In various examples, the user policy engine 110 and the server policy engine 112 (e.g., secure facility 101 server) may operate as a single policy engine for the system 100 as a whole. Such a single policy engine may be provided by the server 106 but may receive policy directions from the user device 200 and/or security system/client device 103. In various examples, the user policy engine 110 may establish policy orchestration for policies and protocols concerning how and under what circumstances a user 102 may be validated, including circumstances in which a user 102 request for admittance to a secure facility 101 and/or secure system/client device 103 may be automatically approved or rejected. In various examples, the policy engine 112 may establish policy orchestration for policies concerning the circumstances in which an authorizing party (e.g., secure facility 101 operator) may be required to authorize a transaction of a user 102. Policy orchestration was discussed in U.S. patent application Ser. No. 14/444,865, filed on Jul. 28, 2014, now U.S. Pat. No. 9,426,183; which is hereby incorporated by reference in its entirety.

In the embodiment of FIG. 4, the server 106 includes a network interface 114 coupleable to the network 108 and a processor 116, The processor 116 may be configured to implement the policy engine 112 as well as a transaction module 118 configured to complete a transaction (or validation) based on a request as received from the user 102. The transaction module 118 may further provide automatic authorizations or rejections based on the authorization policies. The processor 116 may further be configured to operate a risk engine 119 that calculates the risk score of each access to the secure facility 101 or secure system/client device 103 and transactions within post authorization The risk engine 119 operates by analyzing and verifying users identity, inferring contextual data such as user device 200 and browser attributes, spatiotemporal velocity, and user 102 habits. User habits may be analyzed by using secure system/client device 103 and user device sensor hub 109. The risk engine 119 may be a network allocentric or exocentric anomaly detection engine including data sources from the rest of platform stack such as Security Information Event Management (SIEM), Data Loss Prevention (DLP) or Privileged Access Management (PAM) tools to generate a biobehavioral derived score that is used to maintain the biobehavioral derived credential validity. The biobehavioral derived credential validity may be needed to request for authorization in case of loss of confidence, demand for higher level of assurance, or to terminate access by resetting the derived key based on programmed policies of the policy engine 110, 112. The processor 116 may also be configured to implement an information module and inference engine 120 configured to transmit information to and receive information from the devices 200, 202 or 103, such as authorization requests and responsive authorization approvals or rejections. In FIG. 4, data from other sources such as internet of thing (IOT) devices that grab additional ambient intelligence may be fused into the system 100. These devices can be ambient third party data sources such as outside camera systems that see the user 102 as the user 102 traverses during the day in the city or recognize user's car, phone or face which are all used to physically verify that the user 102 was really there in the location versus user digital persona and IDs which can be injected into system electronically and make a synthetic signature of a user 102. Both user device 200 and secure system/client device 103 have an inference engine 111 used in verifying the identity of the user 102.

Figure 5:
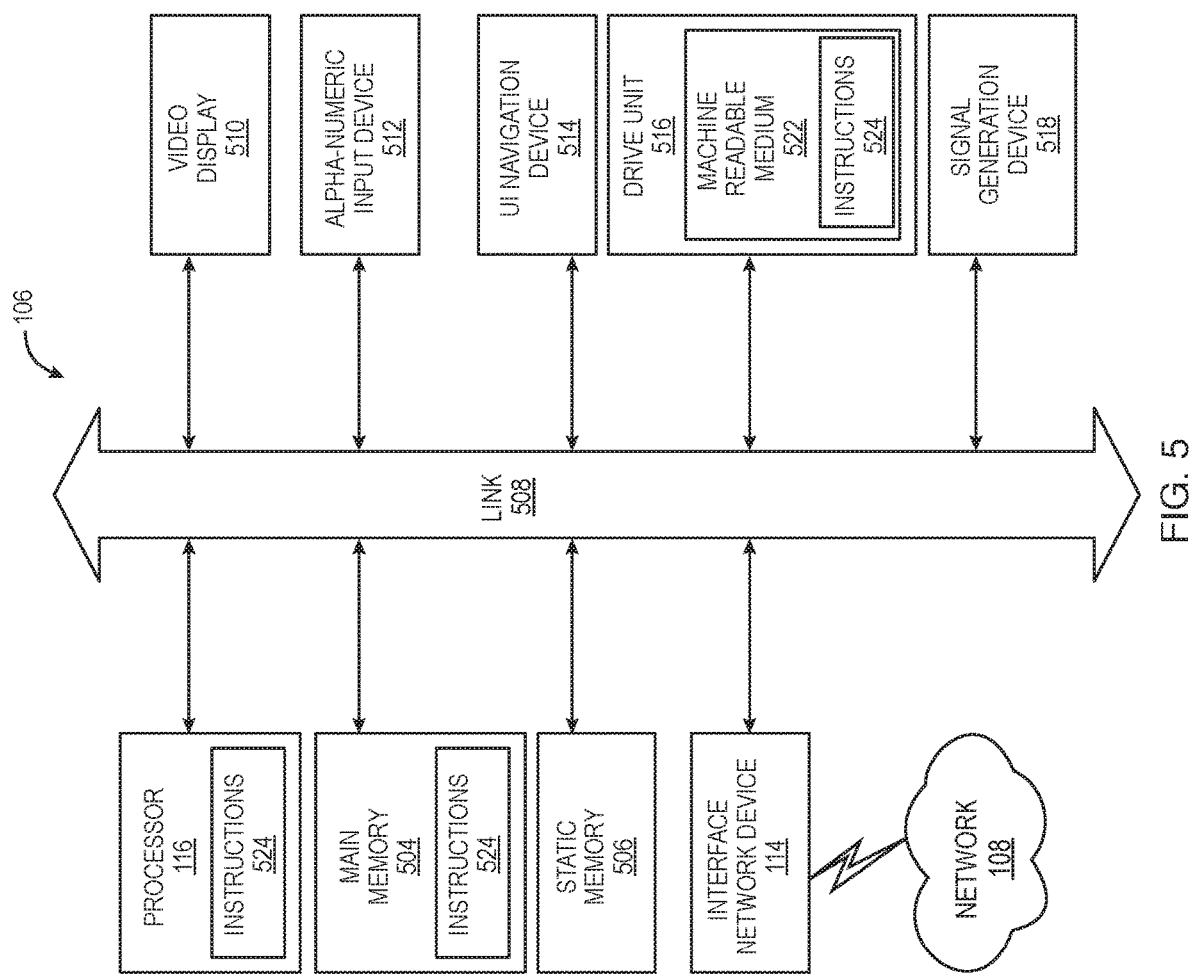
FIG. 5 is a block diagram illustrating components of server 106 able to read instructions from a machine-readable medium.

FIG. 5 is a block diagram illustrating in a more detailed manner the components of server 106, according to some example embodiments, able to read instructions from a machine-readable medium (e.g., a machine-readable storage medium) and perform any one or more of the methodologies discussed herein. Server 106 may be controlled by the operator of the secure facility 101 and/or secure system/client device 103 or it may be controlled an independent party providing a security service to the secure facility 101 or secure system/client device 103. Specifically, FIG. 5 shows a diagrammatic representation of the server 106 in the example form of a computer system and within which instructions 524 (e.g., software) for causing the server 106 to perform any one or more of the methodologies discussed herein may be executed. In alternative embodiments, the server 106 operates as a standalone device or may be connected (e.g., networked) to other machines. In a networked deployment, the server 106 may operate in the capacity of a server machine or a client machine in a server-client network environment, or as a peer machine in a peer-to-peer (or distributed) network environment. The server 106 may be a server computer, a client computer, a user computer (PC), a tablet computer, a laptop computer, a netbook, a set-top box (STB), a user digital assistant (PDA), a cellular telephone, a smartphone, a web appliance, a network router, a network switch, a network bridge, or any machine capable of executing the instructions 524, sequentially or otherwise, that specify actions to be taken by that server. Further, while only a single server 106 is illustrated, the term "server" shall also be taken to include a collection of servers that individually or jointly execute the instructions 524 to perform any one or more of the methodologies discussed herein.

The server 106 includes the processor 116 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 504, and a static memory 506, which are configured to communicate with each other via a bus 508. The machine 500 may further include a graphics display 510 (e.g., a plasma display panel (PDP), a light emitting diode (LED) display, a liquid crystal display (LCD), a projector, or a cathode ray tube (CRT)). The server 106 may also include an alphanumeric input device 512 (e.g., a keyboard), a cursor control device 514 (e.g., a mouse, a touchpad, a trackball, a joystick, a motion sensor, or other pointing instrument), a storage unit 516, a signal generation device 518 (e.g., a speaker), and the network interface device 114.

The storage unit 516 includes a machine-readable medium 522 on which is stored the instructions 524 (e.g., software) embodying any one or more of the methodologies or functions for operation of the biobehavorial system and method 100 described herein. The instructions 524 may also reside, completely or at least partially, within the main memory 504, within the processor 116 (e.g., within the processor's cache memory), or both, during execution thereof by the server 106. Accordingly, the main memory 504 and the processor 116 may be considered as machine-readable media. The instructions 524 may be transmitted or received over a network 526 via the network interface device 114.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 522 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., software) for execution by a server (e.g., server 106), such that the instructions, when executed by one or more processors of the machine (e.g., processor 116), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

In step 1 of FIG. 1, one device or several mobile devices 200 collectively gather data based on the behavior of the user 102 and create or augment a behavior based identity for the user 102. In one embodiment, the collection or gathering of behavior data may be performed using a secure facility operator application installed on the mobile device 200. In certain instances, the mobile device 200 may be a mobile device that is either issued or trusted by an operator of a secure facility 101 and/or secure system/client device 103 to gather user behavior information and the mobile device 200 may have a mobile device manager (MDM) installed on the mobile device 200 to ensure certain policies associated with the use of the device 200.

Behavioral data may include data related to the user 102 as discussed above which may be collected by the cognitive engine 230 from the sensors (e.g., accelerometers, gyroscopes, and/or magnetometers) in the mobile device 200. This information may include information from Wifi, Bluetooth, and/or motion sensors. Higher level behavior inferences may be made such as location that the user 102 slept in (step 1 in FIG. 1), time duration that the user 102 slept for, the location user 102 slept at, running/exercise schedule (step 2), locations the user 102 visited prior to reaching the facility 101 (e.g., user car, coffee shop, gym, etc.) (steps 3 and 4), surfing patterns on the mobile device 200, travel time to or from a known trusted location such as the facility 101 (step 5), and proximity verification on the trusted location. The behavioral data may be continually collected in steps 1-5 as shown in FIG. 1 at least until the user 102 reaches a secure facility 101 or even post stages 6 and 7. Once user 102 is on secure system/client device 103, the user identity may be inferred from contextual data such as user device 200 class of CPU, generation, operating system (OS) version, screen size, browser attributes, access spatiotemporal velocity, user habits such as typing speed and mouse or pad movements and gesture fingerprint, and the user network allocentric or exocentric behavior and signature, including data and application usages, file sharing and sequence of application usage. All of these contextual data may be used for identifying distinguishable patterns and hence maintaining or resetting the validity of biobehavioral derived credential (gold key or third key 114 discussed in detail below). In addition, physiological patterns associated with a user 102, such as walking gait, breathing pattern, sweating pattern, and heart rate may be included as part of the behavioral profile for a behavior based identity for a user 102. This information may be forwarded to server 106 of the secure facility 101 and/or the analysis could occur on the mobile device 200. The behavior of a user 102 is normalized and a confidence score is given based on where the user woke up, what the user did (e.g., steps taken, road traveled, speed of travel and the like) when the user 102 arrives at the facility 101 and the infrastructure beacon and the habits captured from the mobile device 200 to derive a credential. There are three keys (110, 112, and 114) that collectively result in granting access to a critical asset such as secure facility 101 and/or secure system/client device 103. The blue key (or first key) 110 is the key embedded in the user device 200 with trusted execution environment (TEE), or secure element (SE) chip (standard chip for processing payments and key exchange) with specialized software and tamper resistant hardware or a trusted platform module (TPM). In this case the user device 200 is a unique key and provisioned by the enterprise in charge of security of secure facility 101 or secure system/client device 103. The green key (or second key) 112 is generated by determining the behavior of the user 102 through measuring against graphed behavior using the user device 200 and meeting a confidence threshold. The gold key (or third key) 114 is generated by (or derived from) the blue key 110 and green key 112 as valid with certain thresholds being met plus the additional or final validation performed by facility 101. This additional validation may be a biometric face recognition through a specialized secured vision system as illustrated in FIG. 1 or an alternative third step of authentication via an out of band notification initiated by location based services that sends a push notification to user devices 200 or 202. The additional validation may also be one or more of a plurality of other protocols at the secure facility 101. These protocols may include voice recognition; finger print; proximity based challenge and response via phone or wristband; push notification to the first mobile device; push notification to second mobile device; out of band notification challenge to the first mobile device requiring biometric or PIN number response; and out of band notification to the second mobile device requiring biometric or PIN number response.

In certain embodiments, the secure facility 101 may not allow the user 102 to bring with them a full featured mobile device 200 within the secure facility 101. In such instances, in step 5, once the facility computer establishes the authenticity (e.g., through identification application such as "It'sMe" and "I'mHere") for the user 102 of the mobile device 200 then it allows the biobehavioral green key (or second key) 112 to be transferred from the mobile device 200 to a facility issued auxiliary user device 202 (or a personal user device that was provisioned with the blue key 110). For example, the user 102 may establish authenticity (e.g., "I'mHere") by logging into the secure facility 101 by WiFi or simply by initiating the location based service (LBS) identification application (e.g., I'mHere™) function of user device 200 that initiates the communication with the secure facility 101. In steps 6a-6c of FIG. 1, the user 102 establishes with the secure facility 101 their authenticity (e.g., "I'm Here" and "It'sMe") by either a authentication completed using a facility 101 biometric verification or through LBS initiated transaction as a sequence. This sequence may be an identification application that provides a trigger to the secure facility 101 through radio frequency (RF) or through the Internet network 108 initiating a location based service proving proximity and requesting an authentication that is sent for verification to user device 200 or auxiliary user device 202 (e.g., I'mHere™ and/or It'sMe™ sequence). In that context in step 5, once the user 102 reaches the secure facility 101, in certain embodiments the user 102 logs into the secure facility wireless connection with the mobile device 200 (e.g., restricted WiFi Social Security Identification (SS ID) for employees) and sends an environment identification (ID) (SSID, global positioning system (GPS) location, device unique and secure ID, behavioral risk, score, or the like) establishing that the user 102 is in the vicinity or at the secure facility 101 along with the green key 112 and identifier (i.e., blue key) for the mobile device 200 (e.g., mobile identifier number) to the server 106 at the secure facility 101 using the identification application (I'm Here™) functionality of user device 200. In some embodiments this location based service authentication is initiated by the secure facility 101 detection mechanisms of user 102 via methods such as face recognition. This triggers server 106 to send an authentication request to user 102 through an out of band method. The user 102 may confirm via the mobile device 200 using a fingerprint, face recognition, passcode or other techniques that it is truly the user 102 (e.g., "It's Me") upon receiving the out of band notification sent to device 200 by server 106. The secure facility 101 issued auxiliary user device 202 may have its own unique key (indicated as blue key (or first key) 110 in FIG. 1) and a cryptographic engine for the purposes of performing a challenge response authentication with the server 106 of the secure facility 101.

In step 5 and steps 6a-6b of FIG. 1, in an alternative embodiment, the user 102 goes up to the secure facility 101 entrance location. In certain embodiments, the facility server 106 recognizes the user 102 using facial recognition, walking gait, and other physiological unique characteristics. These physiological characteristics may include but not be limited to weight, height, distinct wearables (e.g., watch, clothing, glasses), gestures, or the like of the user 102. The facility server 106 may also perform a challenge response with the facility issued user device 200 on the user 102 to verify that the authenticity of the user device 200 and its paired and associated with the user 102. The server 106 of the secure facility 106 may also receive the green key (behavioral key/score second key) 112 stored on the facility issued user device 200. The server 106 of the secure may use a combination of facial recognition and other factors, green key risk factors evaluating any type of abnormalities and with the blue key 110 as the primary minded key to the device as first identifier to verify the user 102 and allow access to the secure facility 101. Data privacy hardware and special software tokenizes the information about user habits, device and location and provides a confidence score versus the raw data that can be a privacy concern. The confidence score is used to combine with the face recognition and biometric authentication using the mobile device 200 helps the proper generation of the "biobehavioral derived credential" third key 114 of the user at the time of entrance to the secure facility 101. The credential (or third key) is transferred to auxiliary user device 202 for use in the secure facility 101 and/or with the secure system/client device 103. When the user 102 leaves the secure facility 101 the biobehavior credential refreshed during the on premises activities may be transferred back to the mobile device 200 to contiguously maintain the green key (or second key) on user device 200. While on premises of the secure facility 101, auxiliary user device 202 continued to collect biobehavioral data which is passed with the green key back to the user device 200 upon exiting the secure facility 101.

Based on the behavioral data, the auxiliary user device 202 generates (either locally or by sending the information to remote server 106) a behavioral confidence score that the user of the device 202 is in fact the user 102 and not someone else. This behavioral confidence score may be paired with a behavioral fingerprint generated for the user 102 derived from secure system/client device 103 (FIG. 1, FIG. 4).

In certain embodiments, as discussed above, the secure facility issued auxiliary user device 202 may be specialized hardware (e.g., ASIC, FPGA) with one or more communication modules (e.g., radio frequency, near field communication, Bluetooth Low Energy (BLE)). At the secure facility 101, the credential is passed to the auxiliary user device 202 to be an inherited credential device that now with verification of the threshold of validity of blue key (first key) 110 and green key (second key) 112 and an additional location based service check has generated the gold key (third key) 114 (i.e., a biobehavioral derived credential). The gold key (third key) is a time based one time password which can be used through the secure facility 101 for certain minutes, days or other predetermined time periods based on defined policies. The pairing verification and transfer of the credential from the secure facility 101 and from user device 200 to auxiliary user device 202 may done by using radio protocols for data transfer such as BLE, RF identification (RFID), near field communication (NFC) or other mediums of data transfer.

The uses for the credentialed auxiliary user device 202 are many as shown in steps 7-9. In one example, the auxiliary user device 202 is a device on a wristband worn by the user 102 which continuously receives a heartbeat from the user 102 and detects if there is any abnormality. If the wristband is detached from a user's wrist and heartbeat is lost, a signal is sent to the operator of the secure facility 101 and the biobehavioral derived credential (i.e., the gold key or third key 114) is invalidated. In another example, if the user 102 wearing the auxiliary user device 202 in the facility 101 goes to locations that are not allowed for the user a signal is again sent to the operator of the secure facility 101 and the biobehavioral derived credential (i.e., gold key or third key) 114 is again invalidated. While in the secure facility 101, the auxiliary user device 202 may be used to unlock doors, unlock computers, access data and applications that are permitted, track a heat map of the user 102 inside the secure facility 101, monitor data and application usages within system 103 post authentication and authorization continuously.

Allowing access to the secure facility 101 may include but is not limited to physical access or permission to enter the secure facility 101. In certain embodiments, the facility server 106 may issue a temporal key with specific access permissions for the user 102 and store the temporal key on the facility issued auxiliary user device 202. This temporal key is indicated as a gold key (or third key) 114 in the figures. The gold key 114 may provide access to certain resources within the facility 101 as shown in FIG. 1. For example, the gold key 114 may allow the user 102 to access certain secure systems 103 or certain files or allow/restrict users physical access to certain areas of the secure facility 101.

In one exemplary embodiment of biobehavioral system and method 100, while in the secure facility 101 the users 102 location and heartbeat may be tracked by the auxiliary user device 202. Accessing secure system 103 accounts can also be used to track how many people are in the building of a secure facility 101 on certain floor through triangulation of signals creating a heat map of people. In a use example, this may help first responders to identify how many people on a certain floor on a certain building of the secure facility 101. Inside the secure facility 101 the user device 202 in the form of a wristband (or phone when allowed) can be used to open doors or access files and computers. If inside the secure facility 101 something changes like going to privileged facility locations which are not permitted for the particular user 102 such as data centers or sensitive compartmented information facilities (SCIFs) the walking gait of user 102 changes, the heartbeat of user 102 is lost through detachment of the user device 202 (e.g., wristband), then the biobehavioral derived credential (third key 114) may be revoked and user 102 needs to go to either the entrance gate of the secure facility 101 or to designated desks or kiosk for evaluation and re-authentication.

Figure 6:
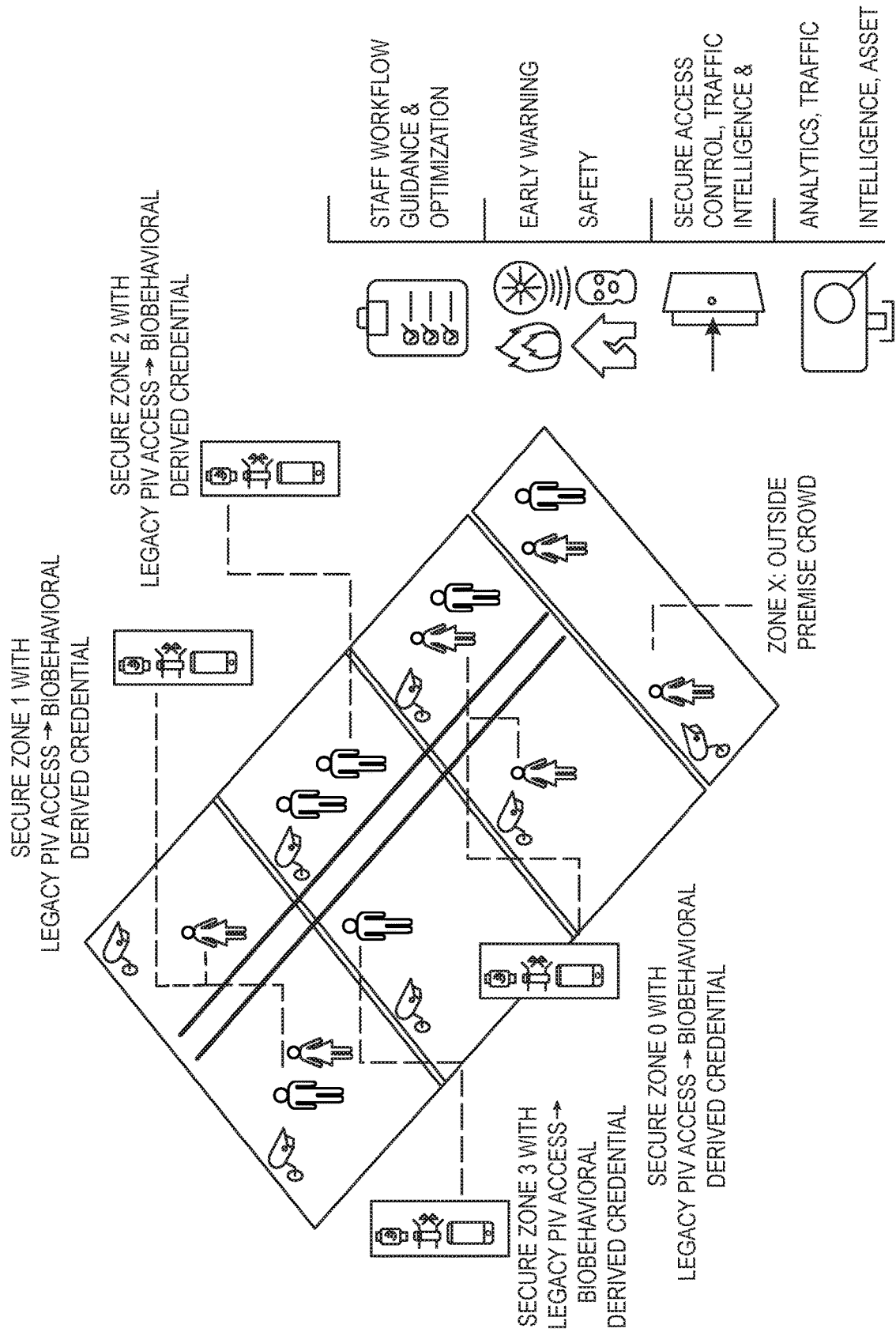
FIG. 6 illustrates a schematic view of secure facility 101 in which a credentialed auxillary user device 202 and/or secure system/client device 103 is used.

FIG. 6 shows the use of the auxiliary user device 202 within the secure facility 101. User device 200 or auxiliary device 202 is used for physical access management to enter various zones. The location of user 102 tracked within facility zones of the secure facility 101 allowing a policy orchestration and ability to configure access to data and applications through secure system/client device 103 or user device 200 using a premise aware security. In one embodiment the user 102 entering a SCIF can be detected and accordingly network access policies can change. For example in one embodiment the remote access such as remote desktop protocol (RDP) or virtual private network (VPN) when user 102 enters the facility is disabled automatically via detection of user 102 badging in using a legacy PIV/CAC card versus user device 200 or 202. The user 102 only when in SCIF (e.g., zone 3) will only have access to highly sensitive and privileged data. In another embodiment the user device 200 and 202 allows to tracking where about and count of users in the facility and in an event of an emergencies proper signals are provided to first responders to prioritize the rescue mission for targeted personnel who may need most assistance and are most at risk.

As shown in step 7, in certain embodiments, the secure facility 101 issued auxiliary user device 202 may continue to collect behavioral information from the user 102. This information may be transmitted to the facility server 106 for further analysis. For example, if the facility server 106 detects some abnormality with the user 102, the facility server 106 may put a restriction on the user's gold key (or third key) 114 or revoke the gold key 114. In certain embodiments, the user 102 would be required to visit a facility manager or security desk or kiosk to re-authenticate the user 102 and remove the restriction or reissue a new gold 114 key.

As previously discussed, steps 7 and 8 of FIG. 1 disclose access to certain secure facility 101 resources such as specific rooms or computer and information systems 103. In step 9 and 10, the user exits the secure facility 101. The exit may be through a door or a portal. Upon exit the gold key 114 is expired/revoked, such that the gold key 114 cannot be used to access the facility resources anymore unless steps 6a-c are repeated and a new gold key 114 is derived.

The gold key 114 may be revoked (e.g., terminated and/or expired) for other reasons not illustrated in FIG. 1. For example, the gold key 114 may be revoked (effective immediately) if employment for a user 102 is terminated. Also, the gold key 114 may be revoked if the user 102 removes the facility issued auxiliary user device 202 from their body. For example, a discontinuation of a pulse or certain constant movement and/or temperature associated with a user 102 may cause the gold key 114 to be revoked. This technique restricts use of the key by user 102 that was issued the gold key 114 and ensures a unique binding to each individual user 102.

In step 11, the facility issued auxiliary user device 202 may synchronize with the user device 200 upon exiting the secure facility 101. In certain instances, the facility issued auxiliary user device 202 may provide behavioral data collected by the auxiliary user device 202 to the user device 200, so that the user device 200 can include behavioral information from the user 102 while the user was inside the secure facility 101 and continue to build its behavioral profile. It is to be noted that such transfer of behavioral information from the auxiliary user device 202 to the user device 200 may be restricted to avoid providing security sensitive information to the user device 200. Upon exit from the facility 101 it is desired to clear the indoor credential so the outside world can not uniquely identify employees of a certain enterprise or agency protecting them against being signed out and yet be known as associates of a certain organization.

In an alternative embodiment of the system and method 100, the auxiliary user device 202 will not have integrated compute capabilities and limited sensors which will inherit biobehavioral information from the user device 200 (such as a paired mobile phone) as well as its own data on habits, behavior, and events like location, walking gait, exercise patterns of the user 102 inferring and calculating risk inside and outside the secure facility 101.

Figure 7:
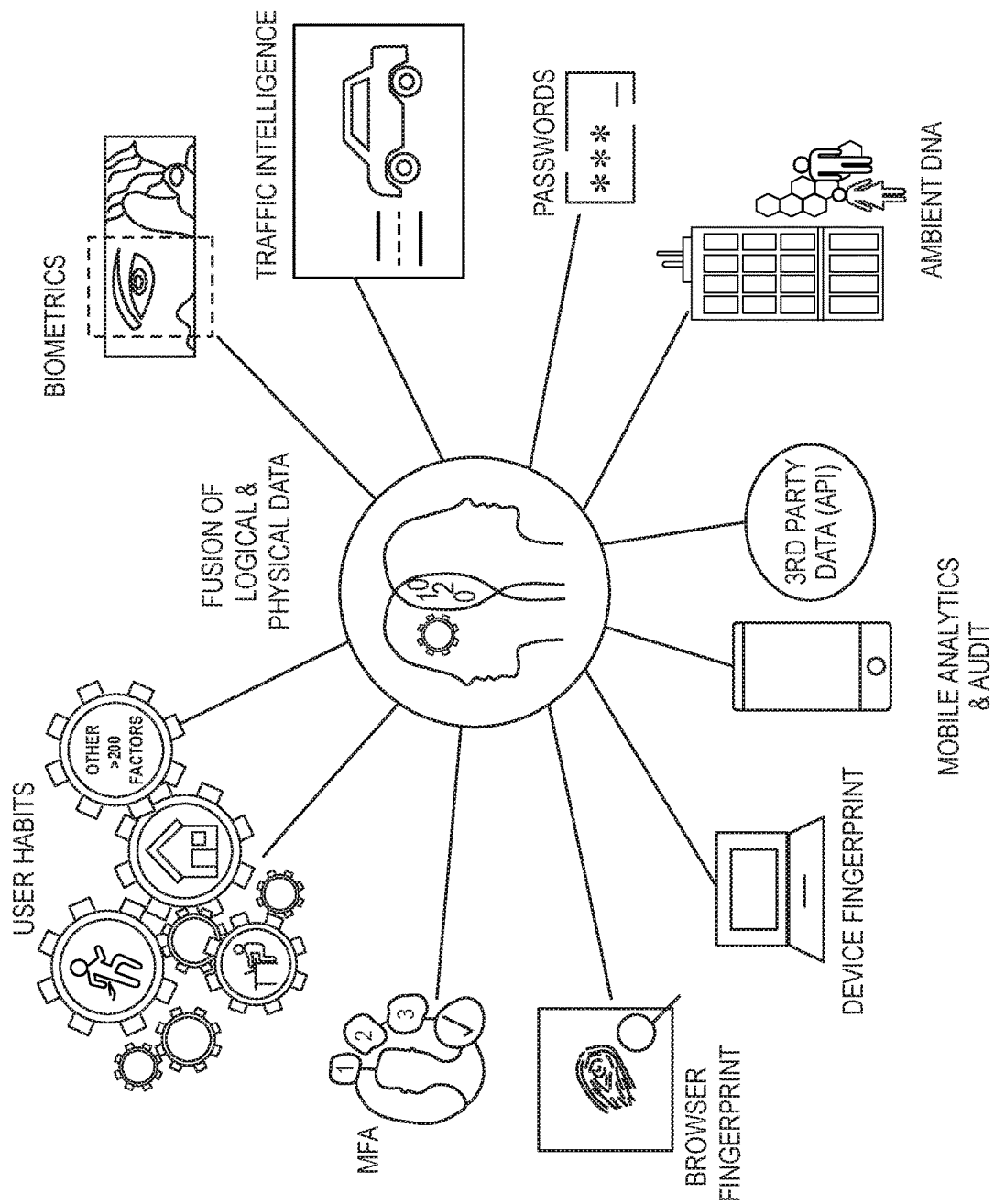
FIG. 7 illustrates a graphic of a wide variety of behavioral inputs to the system 100.

FIG. 7 is a diagram showing some of the inputs that go into creating a biobehavorial profile of a user 102. The biobehavorial profile may merge physical and logical data many of which is collected from the user device 200, secure system/client device 103 and/or auxiliary user device 202. This physical and logical data may include user 102 habits, biometrics (e.g., iris scans), traffic intelligence, passwords, ambient DNA, third party, mobile analytics, device (i.e., 200, 202) fingerprint, device browser fingerprint, and/or multi-factor authentication.

Figure 8:
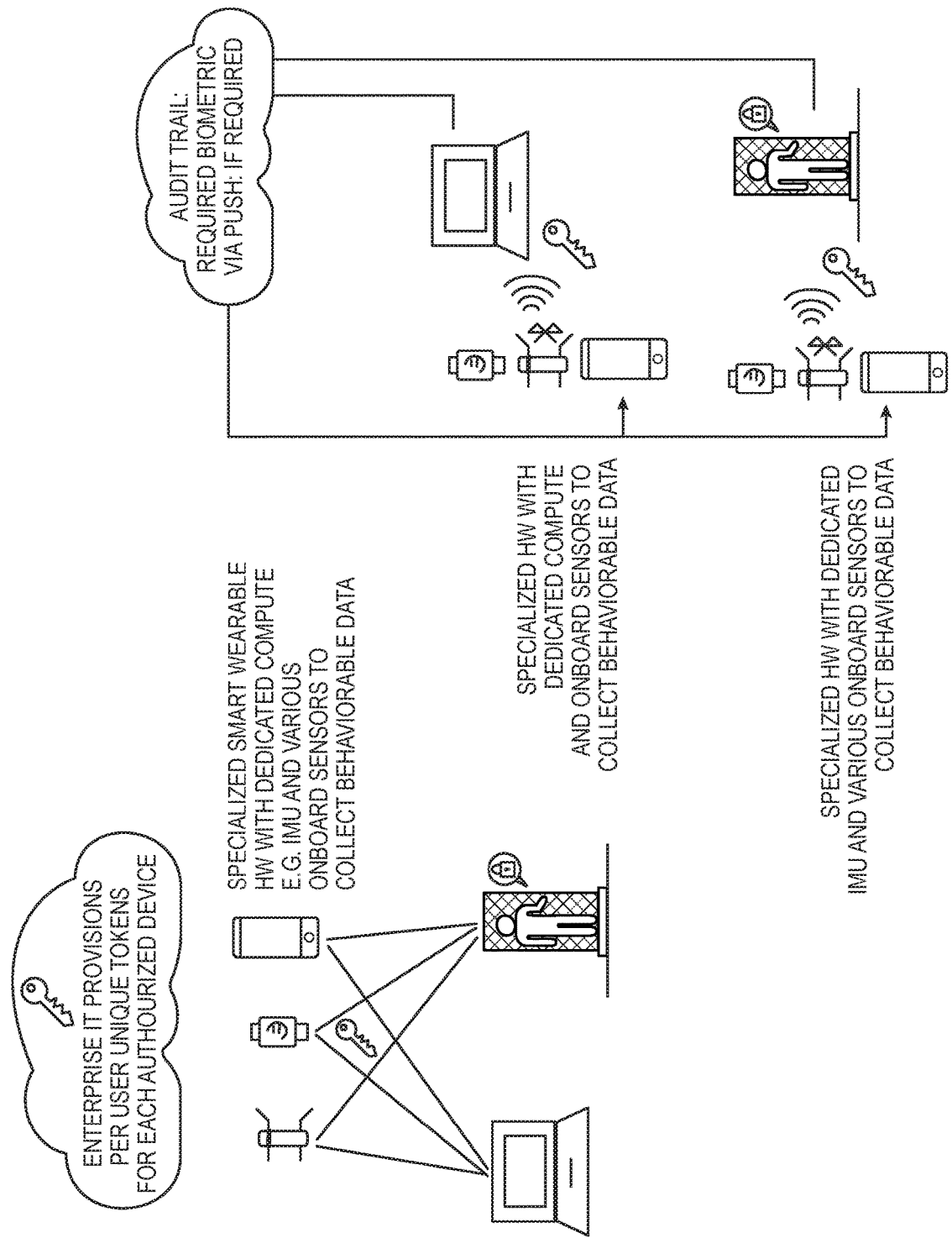
FIG. 8 illustrates provisioning of user device 200 or an auxiliary user device 202 with a unique key (e.g., blue secure code key such as an eGuardian® device key) for root of trust base key for identity access management or physical access management.

FIG. 8 illustrates provisioning of the auxiliary user device 202 with a derived key for identity access management and physical access management. Both the user device 200 and 202 are configured and provisioned with keys and paired to authenticate and communicate with each other. In alternative embodiments, there may be created a secure facility 101 on-premise time based one time password as the derived credential of the issues device provisioned unique key plus the Biobehavioral™ key plus an on-premise verification such as face recognition or other identity techniques and generated biobehavioral derived credentials.

Figure 9A:
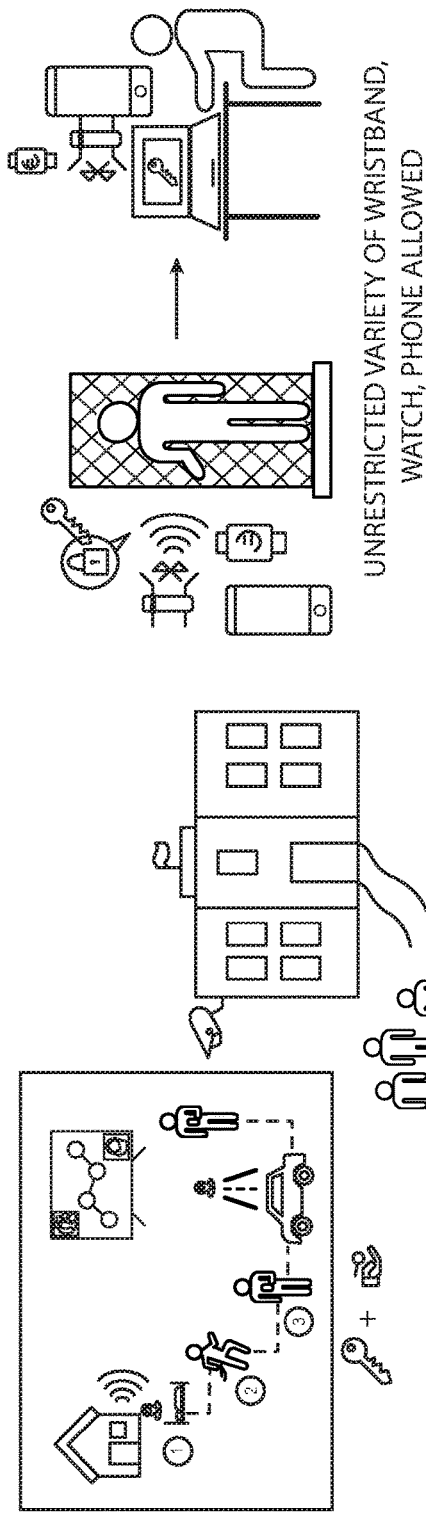
FIGS. 9A and 9B illustrate schematic views of two classes of facilities with different permitted identify and access management and policy access management device policies.
Figure 9B:
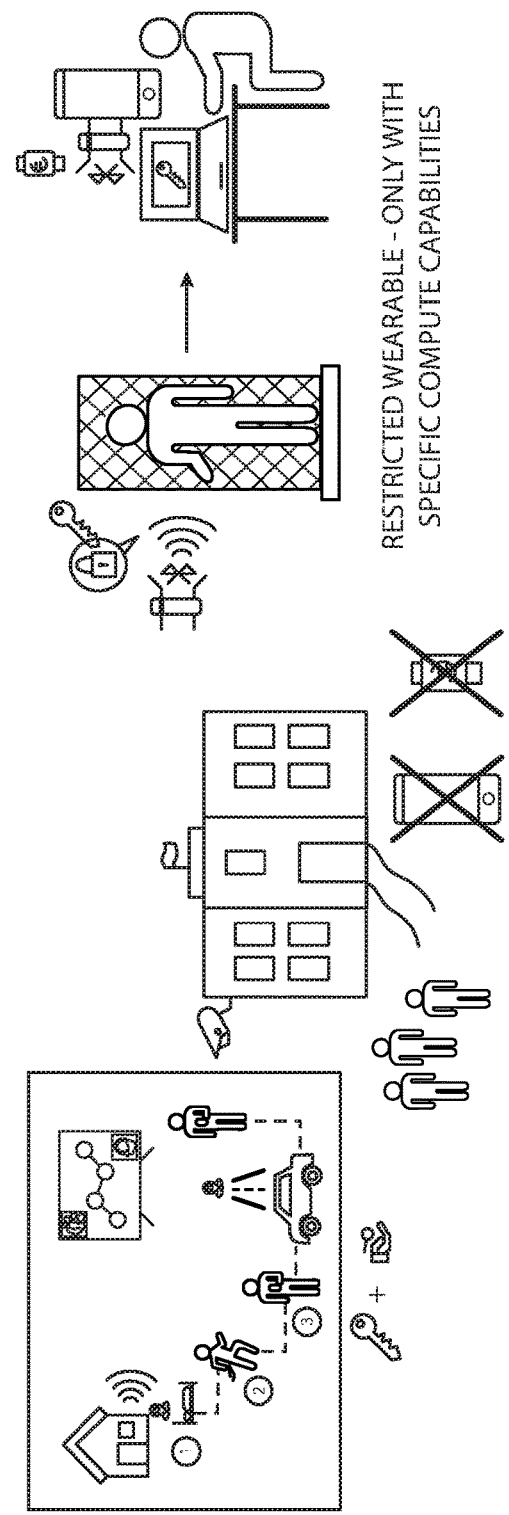

FIGS. 9A and 9B illustrate two classes of facilities with different permitted identity access management (IAM)/privileged access management (PAM) device policies. Use of provisioned hardware in place is combined with the biobehavioral credential. Note that security facilities 101 may not allow hardware platforms such as cell phones for various security reasons.

FIGS. 10A-D illustrate the use of biobehavioral keys for different scenarios of platform capabilities and various classes of transactions (some devices with onboard biometrics versus not).

Figure 10B:
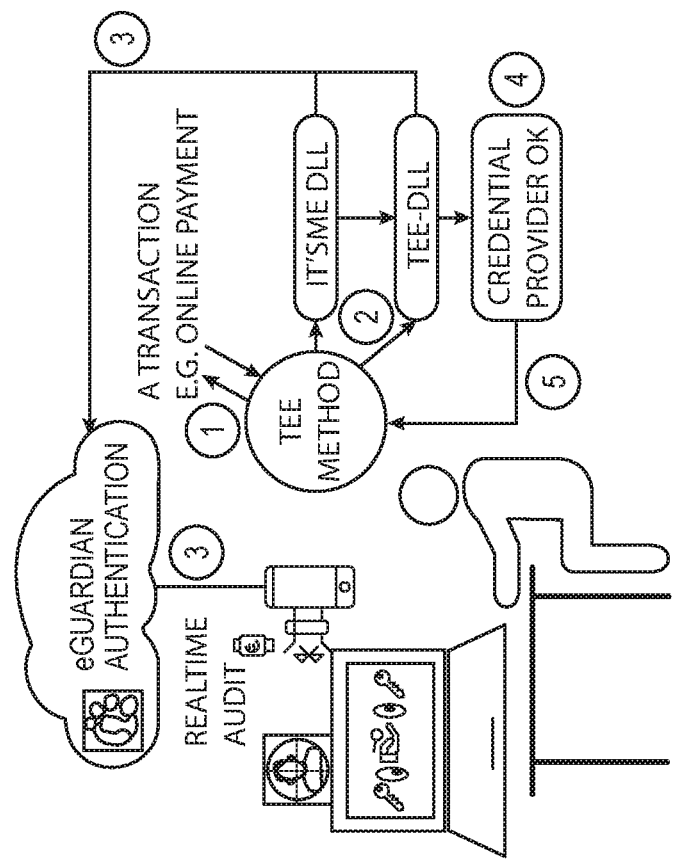
FIGS. 10A-10D illustrate graphical views of the use of biobehavioral derived credentials for different scenarios of platform capabilities and various classes of transactions (some devices with onboard biometrics versus those without).
Figure 10A:
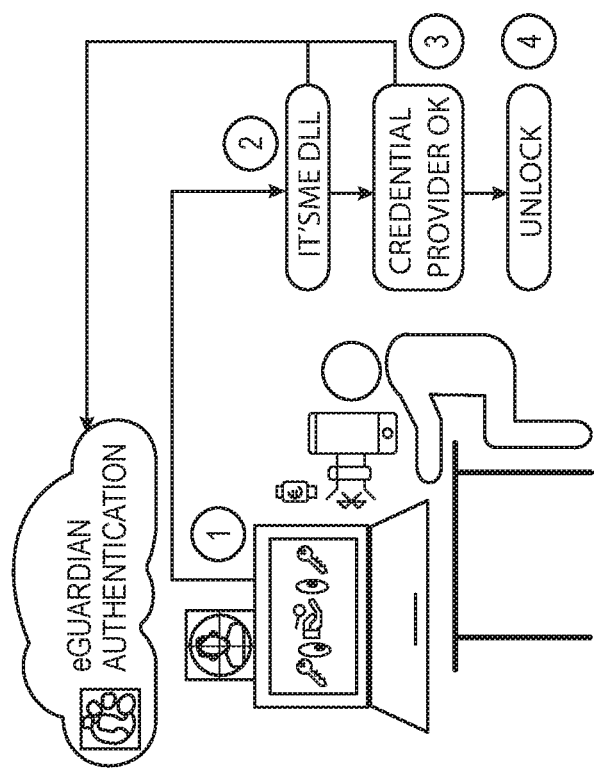

FIG. 10A illustrates the unlocking the secure system 103 by device 200 or 202. User 102 or user device 200 or 202 initiate an authentication sequence to confirm the intent to unlock the secure system 103. The onboard software authentication (e.g., It'sMe) service/dynamic-link library (DLL) responsible for processing the authentication of device 200 or 202 and presenting the biobehavioral derived key 114 recognizing first key 110, authenticates device 200 or 202 and sends an audit record indicating the intent to login in the event log associated with secure system 103 in server 106 memory. If a valid biobehavioral derived key 114 and the secure system 103 operating system and associated authentication system recognizes the biobehavioral derived key 114 for user 102 as a privileged and authorized access then system 103 approves access and an audit record is generated as access is granted and applications and system data of system 103 are unlocked.

FIG. 10B illustrates an example of a transaction that is initiated via secure system 103 that requires further authentication and even post authorization to access secure system 103 by device 200 or 202. User 102 initiates a transaction depending on whether secure system 103 has the embedded behavioral derived credential or desired methods of authenticating the user identity such as a Trusted Execution Environment (TEE) or devices 200 and 202 need to play that role in the authentication for the transaction such as an online payment may be done by secure system 103 itself or maybe commissioned to the auxiliary companion devices such as user device 200 or auxiliary user device 202 with the biobehavioral derived credential key 114. The authentication sequence to confirm the intent for the transaction in the system 103 via the onboard software authentication (e.g., It'sMe service/DLL) or the system 103's embedded Trusted Execution Environment (TEE) DLL. TEE-DLL in FIG. 10B is only recorded in server 106 and on devices 200 and 202 which itself can be recognized as a discrete event and hence a habit of the user 102. Secure system 103 through server 106 records the authentication of transaction and the TEE-DLL allows system 103 to authenticate the user 102 with the credential provider and authorizing the transaction while capturing the transaction in the memory of server 106 and user device 200 or auxiliary user device 202 for audit purposes.

Figure 10D:
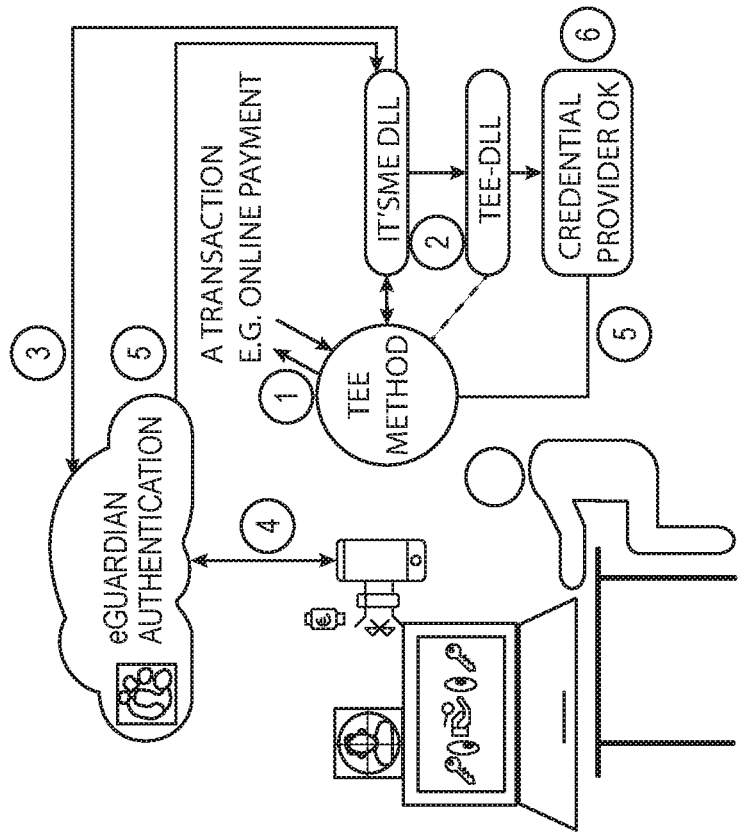
Figure 10C:
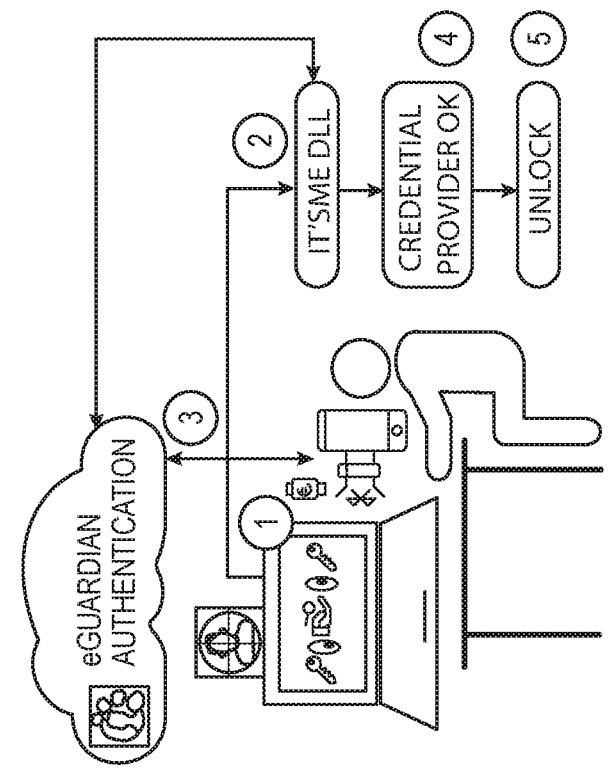

FIG. 10C illustrates unlocking the secure system 103 by device 200 or 202. Device 200 or 202 initiate an authentication sequence to confirm the intent to unlock the system 103. The onboard software authentication service (e.g., It'sMe service/DLL) responsible for processing the authentication of device 200 or 202 and presenting the biobehavioral derived key 114 recognizing first key 110, authenticates device 200 or 202 and sends an authentication request and an audit record during state 1006 indicating the intent to login in the event log associated with secure system 103 in server 106 memory. During state 1008 the server (e.g., eGuardian server) 106 sends an authentication request to device 200 or 202 via network 108 requesting for approval using device 200 or 202 to confirm the intent was originated by the user 102. If an approved transaction in state 1008 and a valid key 114 is present and the secure system 103 operating system and associated authentication system recognizes the biobehavioral derived key for user 102 as a privileged and authorized access then system 103 approves access and an audit record is generated as access is granted and applications and system data of system 103 are unlocked.

In FIG. 10D the authentication of user can be commissioned to the user device 200 or auxiliary user 202 through authentication software (e.g., It'sMe DLL) and server 106 send the request via network 108 to devices 200 or 202. User device 200 or auxiliary user device 202 can authenticate and authorize if biobehavioral derived credential (i.e., third key 114) is valid or else a request for higher level of assurance to device 200 or 202 such a biometric authentication or a personal identification number (PIN) is requested to mitigate absence of a valid derived credential on device 200 or 202.

By constantly observing and analyzing their routines, the process of biobehavior modeling creates models that allow for prediction of the next actions of the users 102 and detect and distinguish legitimized, suspicious, or sub-optimal and even dangerous behavior. This modeling process applies state-of-the-art technologies from artificial intelligence and machine learning and affects many levels of peoples daily lives. From abstract concepts such as commute and exercise activity, or browser behavior and computing devices to more subtle patterns like the unique characteristics of a user's walking gait and more traditional biometrics. This unique combination of factors unambiguously characterizes our users and allows the eGuardian® decision-making risk engine to rate behavior. Consequently, it computes a dynamic level of assurance that takes the maximum of contextual information into account. Similar to the dynamic nature of human live, the biobehavioral system and method 100 continually observes and adapts to changes and "grows" together with its users 102 and is at the heart of a cognitive continuous authentication.

The following will provide three typical use cases and the requirements that arise to a cognitive continuous authentication arising system. The last section will give an overview on the involved technologies with a focus on the data that is collected and the specific algorithms applied. The approach to continuous cognitive authentication described herein involves biobehavior modeling. This refers to a unique mixture of biometric aspects of a user and his behavior. This follows the philosophy that a single trait of a user, the fingerprint or iris for instance, can be spoofed by a replay attach. Therefore, multiple biometric traits and beyond are fused, also by unify biometric authentication with behavior modeling. This raises the bar for attackers but actually, lowers the fruition for end users as they are simply supposed to act naturally. Daily behavior is analyzed with mobile and ambient data. The first use case for biobehavior involves an end user that tries to access either a remote or local resource that requires authentication. While device fingerprinting (for remote) and biometrics (for local access) can be used for authentication, both are vulnerable to replay attacks. Multifactor authentication (MFA) that requires an additional out-of-band device (e.g., a confirmation on mobile phone) significantly increases security. However, is insufficient as a loss of the device and the increase in friction is significant. The biobehavior approach may also rely on an out-of-band device such as a mobile phone or wearable devices but offers three important advantages.

First, the authentication factor. The system benefits from the rich sensors in modern mobile devices. Based on that, the employed artificial intelligence uses machine learning (AIML) to recreate models that can recognize regular and abnormal behavior, detect anomalies in the ambient sensor data (i.e., missing background noise when being in a public space or an unusual walking gait), and, in general, verify whether it is still in the possession of its owner. As such it is an essential part of the authentication process. It provides additional, reliable information such as the user's verified location and current activity. For instance, a banking transaction may be unlikely if the user 102 is currently outdoors exercising and even more so the transaction is requested from a desktop computer. On the other hand, the system is adaptive and behavior considered unusual by a majority can be perfectly normal for an individual's unique biobehavior model. Eventually, the models contribute to the overall level of assurance in an access that grants reduced friction to the user 102.

Second, biobehavior as determining authentication. In addition, the system 100 can play a more active role in the authentication process as well. Access from a verified system can be allowed with minimal friction. Then, the biobehavior becomes determining authentication factor. A loss of the mobile device 200, on the other hand, can quickly be detected and reacted upon actively. Accounts are blocked, data is removed (or encrypted) and using the device 200 as an access device will be prohibited.

Third, prediction of user behavior. Machine learning models capture an abstract representation of our routines and unique characteristics on varying time scales. The variants applied in the biobehavior system are capable of predicting future behavior, activities and locations. As such the system can preemptively act on conditions (like suggesting to avoid traffic), prepare a resource ahead of time, or interact with a smart home in a more secure way than geofencing.

Possible fields of application among others are the following. First, all flavors of access of online resources such as banking, online shopping. Second, remote log ins and securing mobile payment. Third, physical access control. Fourth, advanced anticipation. Fifth, predicting sequences of events and preventing harmful actions. The system and method 100 described above is capable of computing a likelihood of an event, for instance, to give a level of assurance resulting from an end user being at a certain location and time. For detecting and anticipating harmful actions or more generally speaking, to predict the immediate future (given the current state), biobehavior incorporates more complex, powerful machine learning that requires more time to establish in exchange. The system and method 100 provide a much deeper insight into an end users behavior and can decompose activities/routines into sequences of actions. As such it is more accurate and faster in detecting the legitimate user 102. But more importantly, this opens up the opportunity to classify actions given certain conditions as harmful, and reliably detect them or even prevent them. As an exemplary scenario, an employee may be denied access to the employers sensible information when he has been at a bar and his gait indicates intoxication.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. As used herein, the conjunction "or" refers to a non-exclusive "or," unless specifically stated otherwise. The terms "connected," "coupled," or any variant thereof, mean any connection or coupling, either direct or indirect, between two or more elements. The coupling or connection between the elements can be physical, logical, or a combination thereof. To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

Example methods and systems described above are directed to biology and behavioral conduct to authorize access to databases, facilities and the like. Unless explicitly stated otherwise, components and functions are optional and may be combined or subdivided, and operations may vary in sequence or be combined or subdivided. In the description, for purposes of explanation, numerous specific details are set forth to provide a thorough understanding of example embodiments. It will be evident to one skilled in the art, however, that the present subject matter may be practiced without these specific details. Although specific advantages have been enumerated above, various embodiments may include some, none, or all of the enumerated advantages.

Other technical advantages may become readily apparent to one of ordinary skill in the art after review of the following figures and description. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below. Unless otherwise specifically noted, articles depicted in the drawings are not necessarily drawn to scale. Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order.

The invention claimed is:

1. A system comprising:
   a first mobile device having a first network interface configured to be communicatively coupled to a first network utilizing a secure communication protocol and at least one first hardware processor of a plurality of hardware processors coupled to a first memory and configured to:
   receive a first security code key and embed the first security code key in the first memory;
   monitor behavior of a user of the first mobile device and compare the behavior against an identity confidence threshold and generate a second security code key based on meeting the identity confidence threshold;
   a second mobile device, cryptographically paired with the first mobile device, having a second network interface configured to be communicatively coupled to a second network utilizing the secure communication protocol and at least one second hardware processor of a plurality of hardware processors coupled to a second memory and configured to: receive and securely store a third security code key based on the first security code key and second security code key being valid and meeting a threshold and the authentication of the user of interest identity; and
   wherein the at least one second hardware processor is further configured to maintain integrity of the third security code key which remains valid as long as time validity of the third security code key has not expired and an anomaly from normal behavior associated with the second mobile device has not occurred.

2. The system of claim 1, wherein the first mobile device is further configured to: graph behavior of the user of the first mobile device to create the identity confidence threshold.

3. The system of claim 2, wherein the behavior graphed by the first mobile device includes at least one from the group consisting of:
   location where the user wakes up, where the user drives to, and if user is deemed normal against the derived collection of the user habits.

4. The system of claim 1, wherein the third security code key is temporal.

5. The system of claim 1, wherein the second mobile device is mounted on a wristband.

6. The system of claim 1, wherein the second mobile device is capable of monitoring behavior of the user and transferring information of the behavioral to the first mobile device along with the third security code key as the biobehavioral derived credential.

7. The system of claim 1, wherein the third security code key can be used to grant access to locations within a secure facility.

8. The system of claim 1, wherein the third security code key can be used to grant access to secure computer systems.

9. The system of claim 8, wherein the secure computer systems include databases and software applications.

10. The system of claim 1 wherein that at least one first hardware processor of a plurality of hardware processors is further configured to:
revoke the third security code key upon exit of a secure facility by the user of the second mobile device while the first security code key the second security code key remain valid until a behavioral anomaly degrades the confidence score of the third security code key to below the threshold.

11. The system of claim 1, wherein the first and second mobile devices are the same.

12. A method of securely allowing access to a restricted facility comprising:
receiving a first security code key at a first mobile device having a first network interface configured to be communicatively coupled to a network utilizing a secure communication protocol and at least one first hardware processor of a plurality of hardware processors coupled to a first memory;
embedding the first security code key in the first memory;
monitoring behavior of a user of the first mobile device and comparing the behavior against an identity confidence threshold;
generating a second security code key based upon meeting the identity confidence threshold;
receiving a third security code key based on the first security code key and second security code key being stored and valid at a second mobile device which is cryptographically paired with the first mobile device, and wherein the second mobile device has a second network interface configured to be communicatively coupled to the network utilizing the secure communication protocol and at least one second hardware processor of a plurality of hardware processors coupled to a second memory; and
wherein the at least one second hardware processor is further configured to maintain integrity of the third security code key which remains valid as long as time validity of the third security code key has not expired and an anomaly from normal behavior associated with the second mobile device has not occurred.

13. The method of claim 12, further comprising: graphing behavior of the user of the first mobile device to create the identity confidence threshold.

14. The method of claim 12, further comprising:
log into a security facility wireless connection using the first security code key and the second security code key to establish authenticity of the user; and
transfer the second security code key to the second mobile device as the third security code key.

15. The method of claim 12, further comprising:
monitoring the user by the second mobile device to determine if there is still a heartbeat and reporting result to a facility server.

16. The method of claim 12, further comprising:
recognizing the user of the first mobile device by the facility server using at least one from the group consisting of: facial recognition, walking gait, height, distinct wearables, and gestures.

17. The method of claim 12, further comprising:
tracking users outside and inside a secure facility for authentication and continuous post-authentication behavior monitoring in both physical location and cyberspace of the user of the first and second mobile devices.

18. A method of securely allowing access to a restricted facility comprising:
receiving a first security code key at a first mobile device having a first network interface configured to be communicatively coupled to a network utilizing a secure communication protocol and at least one first hardware processor of a plurality of hardware processors coupled to a first memory;
embedding the first security code key in the first memory;
monitoring behavior of the user of the first mobile device and comparing the behavior against an identity confidence threshold;
generating a second security code key based upon meeting the identity confidence threshold;
receiving a third security code key based on the first security code key, second security code key, and a plurality of other protocols being stored and valid at a second mobile device having a second network interface configured to be communicatively coupled to the network utilizing the secure communication protocol and at least one second hardware processor of a plurality of hardware processors coupled to a second memory; and
monitoring behavior of the user using the second mobile device and terminating the validity of the third key if an anomaly from normal behavior associated with the user occurs.

19. The method of claim 18, wherein the plurality of other protocols are at least one from the group consisting of: face recognition by a camera; voice recognition; finger print; proximity based challenge and response via phone or wristband; push notification to the first mobile device; push notification to second mobile device; out of band notification challenge to the first mobile device requiring biometric or PIN number response; and out of band notification to the second mobile device requiring biometric or PIN number response.

20. The system of claim 1, wherein the secondary device is capable of receiving biometric information from the user for haptic and taptic analysis for authenticating the user.

21. The system of claim 1, wherein the first network is an internet and the second network is an intranet.

22. The system of claim 1, wherein the third security code key is valid at a predetermined location of the second mobile device and is only valid as long as at the predetermined location.

23. The system of claim 1, wherein the third security code key valid at a predetermined location of the second mobile device and is only valid as long as the second mobile device is at the predetermined location and conduct of the user is similar to past events.

* * * * *